United States Patent
Talluri et al.

(10) Patent No.: US 10,635,566 B1
(45) Date of Patent: Apr. 28, 2020

(54) PREDICTING CODE CHANGE IMPACT WITHIN AN INTEGRATED DEVELOPMENT ENVIRONMENT

(71) Applicant: Cisco Technology, Inc., San Jose, CA (US)

(72) Inventors: Satish Talluri, San Mateo, CA (US); Suraj Puvvada, San Francisco, CA (US); Buchi Reddy Busi Reddy, Sunnyvale, CA (US); Prudhvi Kumar Chaganti, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 193 days.

(21) Appl. No.: 15/665,418

(22) Filed: Jul. 31, 2017

(51) Int. Cl.

| | | |
|---|---|---|
| *G06F 11/34* | (2006.01) |
| *G06F 8/41* | (2018.01) |
| *G06F 11/36* | (2006.01) |
| *G06F 8/71* | (2018.01) |
| *G06F 8/33* | (2018.01) |
| *G06Q 10/06* | (2012.01) |
| *G06F 3/0481* | (2013.01) |
| *G06F 8/75* | (2018.01) |
| *G06F 17/18* | (2006.01) |

(52) U.S. Cl.
CPC ...... *G06F 11/3466* (2013.01); *G06F 3/04812* (2013.01); *G06F 8/33* (2013.01); *G06F 8/433* (2013.01); *G06F 8/71* (2013.01); *G06F 8/75* (2013.01); *G06F 11/34* (2013.01); *G06F 11/3428* (2013.01); *G06F 11/3447* (2013.01); *G06F 11/3457* (2013.01); *G06F 11/3612* (2013.01); *G06F 17/18* (2013.01); *G06Q 10/0639* (2013.01); *G06Q 10/06393* (2013.01)

(58) Field of Classification Search
None
See application file for complete search history.

(56) References Cited

U.S. PATENT DOCUMENTS

| | | | |
|---|---|---|---|
| 9,021,444 B2 * | 4/2015 | Garrett ............... | G06F 11/1448 717/124 |
| 2012/0060142 A1 * | 3/2012 | Fliess ................. | G06F 8/70 717/102 |
| 2012/0079456 A1 * | 3/2012 | Kannan .............. | G06F 8/77 717/124 |
| 2013/0254746 A1 * | 9/2013 | Balakrishnan ..... | G06F 11/3608 717/124 |

(Continued)

*Primary Examiner* — Duy Khuong T Nguyen
*Assistant Examiner* — Mark A Gooray
(74) *Attorney, Agent, or Firm* — Behmke Innovation Group LLC; James M. Behmke; James J. Wong

(57) ABSTRACT

In one embodiment, an integrated development environment (IDE) is maintained on a computing device for managing software code for one or more software programs. At the IDE on the computing device, one or more code changes to the software code are determined between a given version of the software code and a subsequent version of the software code, and then a performance impact of each of the one or more code changes is determined. The IDE (or IDE plugin) prepares user-understandable indications of the performance impact of the one or more code changes, and displays the user-understandable indications of the performance impact in a graphical user interface (GUI) when a respective code change is displayed in the GUI.

20 Claims, 17 Drawing Sheets

(56) References Cited

U.S. PATENT DOCUMENTS

2015/0220426 A1\* 8/2015 Spektor ................ G06F 11/36
717/131
2015/0339207 A1\* 11/2015 Hod .................... G06F 11/3409
717/124

\* cited by examiner

```
package com.appdynamics.tcdemo.app;

public class LocationLookup {
    public static String resource;

public static synchronized void getLocation(int range, int sleepTime) {
        DBLookup.getInfo(Integer.toString(range));
        try {
            Thread.sleep(sleepTime);
        } catch (InterruptedException e) {
            e.printStackTrace();
        }
        return;
    }
}
```

STAGING PUSH 1210

Line numbers: 1 1, 2 2, 3 3, 4 4, 5 5, 6 6, 7 7, 8 8, 9 9, 10 10, 11 11, 12 12, 13 13, 14 14, 15 15

1220

```
package com.appdynamics.tcdemo.app;

public class LocationLookup {
    public static String resource;

public static synchronized void getLocation(int range,...
        DBLookup.getInfo(Integer.toString(range));
        try {
            Thread.sleep(sleepTime);
        } catch (InterruptedException e) {
            e.printStackTrace();
        }
        return;
    }
}
```

HIGHLIGHT ROOT CAUSE 1230

PREDICTING CODE CHANGE IMPACT WITHIN AN INTEGRATED DEVELOPMENT ENVIRONMENT

TECHNICAL FIELD

The present disclosure relates generally to computer software, and, more particularly, to predicting code change impact within an integrated development environment (IDE).

BACKGROUND

Software developers today are pushing code into to production at a very high velocity, leveraging micro-service architectures (MSA or "microservices") and other technologies such as service-oriented architecture (SOA). Typically, developers use what's called an "integrated development (or developer) environment" (IDE), which is a software application that provides comprehensive facilities to computer programmers for software development. IDEs help developers create and test software code (e.g., applications) in an environment with a source code editor, build automation tools, and often built-in debuggers and even intelligent code completion.

Currently, however, software developers are often left to an assessment of their software code as either "it works" or "it doesn't". In other words, if the code performs the desired function, it may deemed a success (i.e., it works), regardless of the whether the performance is inefficient (e.g., large increases in processing latency due to inefficient coding). On the other hand, if the functionality is not a success (e.g., code produces an error, code is stuck in a loop, code dead-ends, code does not produce the desired result, etc.), then the developer can easily determine that something is wrong (i.e., it doesn't work). Most often in this case, though, it may be difficult for the developers themselves to determine exactly what the cause of the problem is, and various experts may need to be called upon to assist in debugging the code. This process is generally considered a cumbersome manner to troubleshoot production incidents, resulting in extended technology downtime and poor customer experiences.

BRIEF DESCRIPTION OF THE DRAWINGS

The embodiments herein may be better understood by referring to the following description in conjunction with the accompanying drawings in which like reference numerals indicate identically or functionally similar elements, of which:

FIG. 12 illustrates an example GUI showing how issues can be caught in the IDE during staging and before production;

FIG. 13 illustrates an example GUI showing navigation of errors and stack traces within the IDE;

FIG. 14 illustrates an example GUI showing predictive analysis of code change impact;

DESCRIPTION OF EXAMPLE EMBODIMENTS

Overview

Figure 1A:
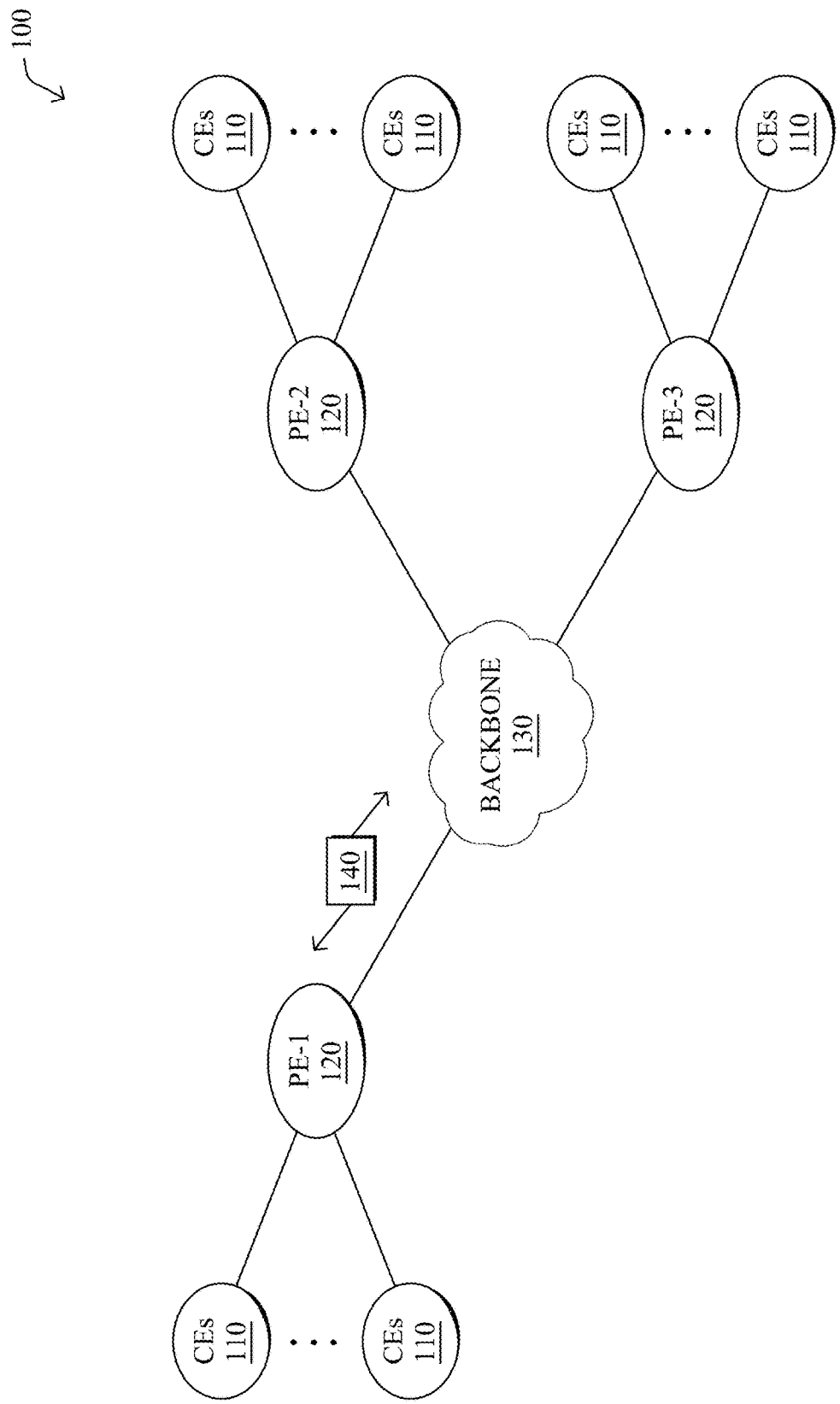
FIGS. 1A and 1B illustrate an example computer network.

According to one or more embodiments of the disclosure, techniques herein maintain an integrated development environment (IDE) on a computing device for managing software code for one or more software programs. At the IDE on the computing device, one or more code changes to the software code are determined between a given version of the software code and a subsequent version of the software code, and then a performance impact of each of the one or more code changes is determined. The IDE (or an IDE plugin/agent/etc.) prepares user-understandable indications of the performance impact of the one or more code changes, and displays the user-understandable indications of the performance impact in a graphical user interface (GUI) when a respective code change is displayed in the GUI.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC), and others. The Internet is an example of a WAN that connects disparate networks throughout the world, providing global communication between nodes on various networks. Other types of networks, such as field area networks (FANs), neighborhood area networks (NANs), personal area networks (PANs), enterprise networks, etc. may also make up the components of any given computer network.

The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or power-line communication networks. That is, in addition to one or more sensors, each sensor device (node) in a sensor network may generally be equipped with a radio transceiver or other communication port, a microcontroller, and an energy source, such as a battery. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics.

Figure 1B:
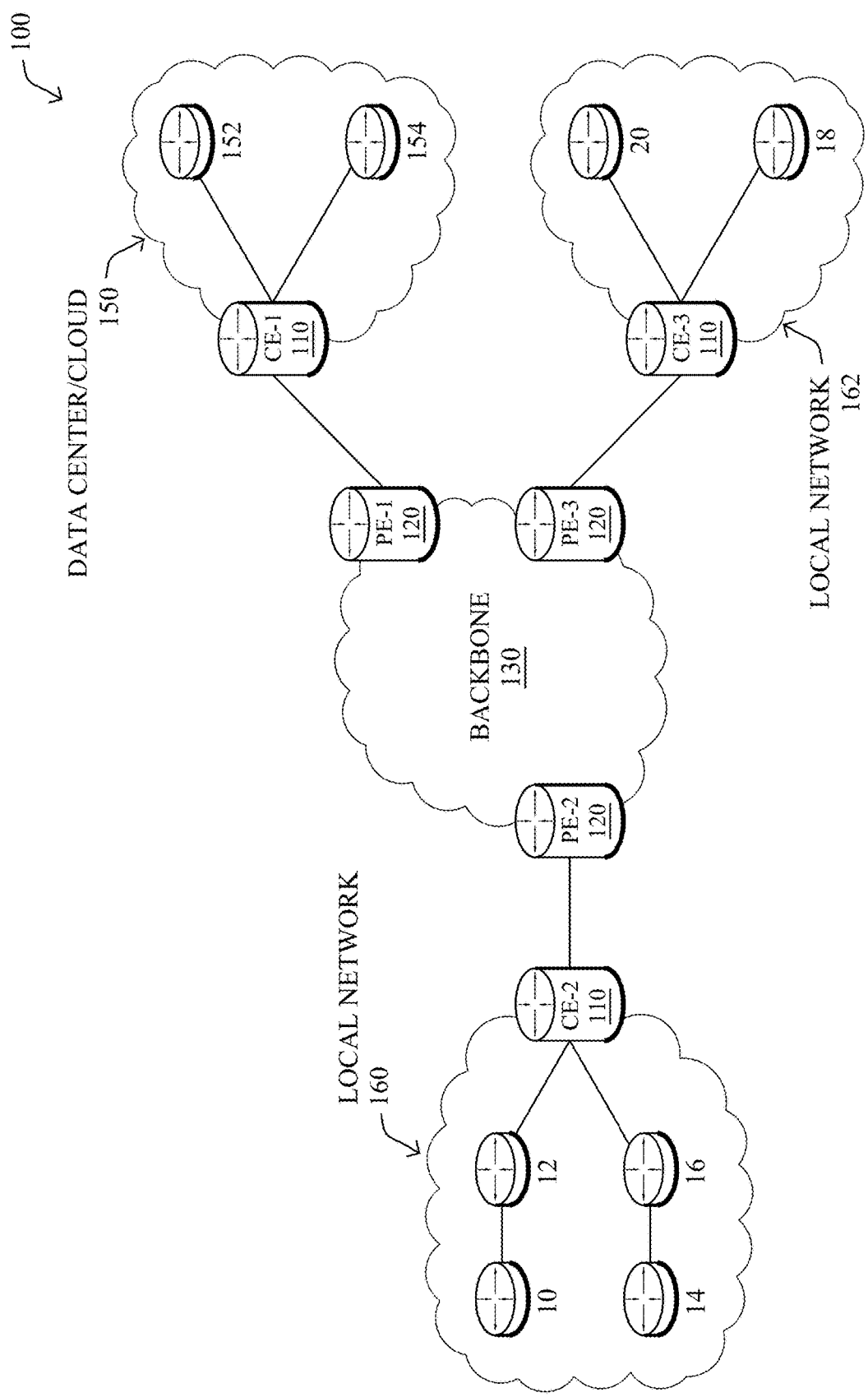

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations. Servers 152-154 may include, in various embodiments, any number of suitable servers or other cloud-based resources. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc. Furthermore, in various embodiments, network 100 may include one or more mesh networks, such as an Internet of Things network. Loosely, the term "Internet of Things" or "IoT" refers to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless networks, are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen to thousands or even millions of LLN routers, and support point-to-point traffic (between devices inside the LLN), point-to-multipoint traffic (from a central control point such at the root node to a subset of devices inside the LLN), and multipoint-to-point traffic (from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

In contrast to traditional networks, LLNs face a number of communication challenges. First, LLNs communicate over a physical medium that is strongly affected by environmental conditions that change over time. Some examples include temporal changes in interference (e.g., other wireless networks or electrical appliances), physical obstructions (e.g., doors opening/closing, seasonal changes such as the foliage density of trees, etc.), and propagation characteristics of the physical media (e.g., temperature or humidity changes, etc.). The time scales of such temporal changes can range between milliseconds (e.g., transmissions from other transceivers) to months (e.g., seasonal changes of an outdoor environment). In addition, LLN devices typically use low-cost and low-power designs that limit the capabilities of their transceivers. In particular, LLN transceivers typically provide low throughput. Furthermore, LLN transceivers typically support limited link margin, making the effects of interference and environmental changes visible to link and network protocols. The high number of nodes in LLNs in comparison to traditional networks also makes routing, quality of service (QoS), security, network management, and traffic engineering extremely challenging, to mention a few.

Figure 2:
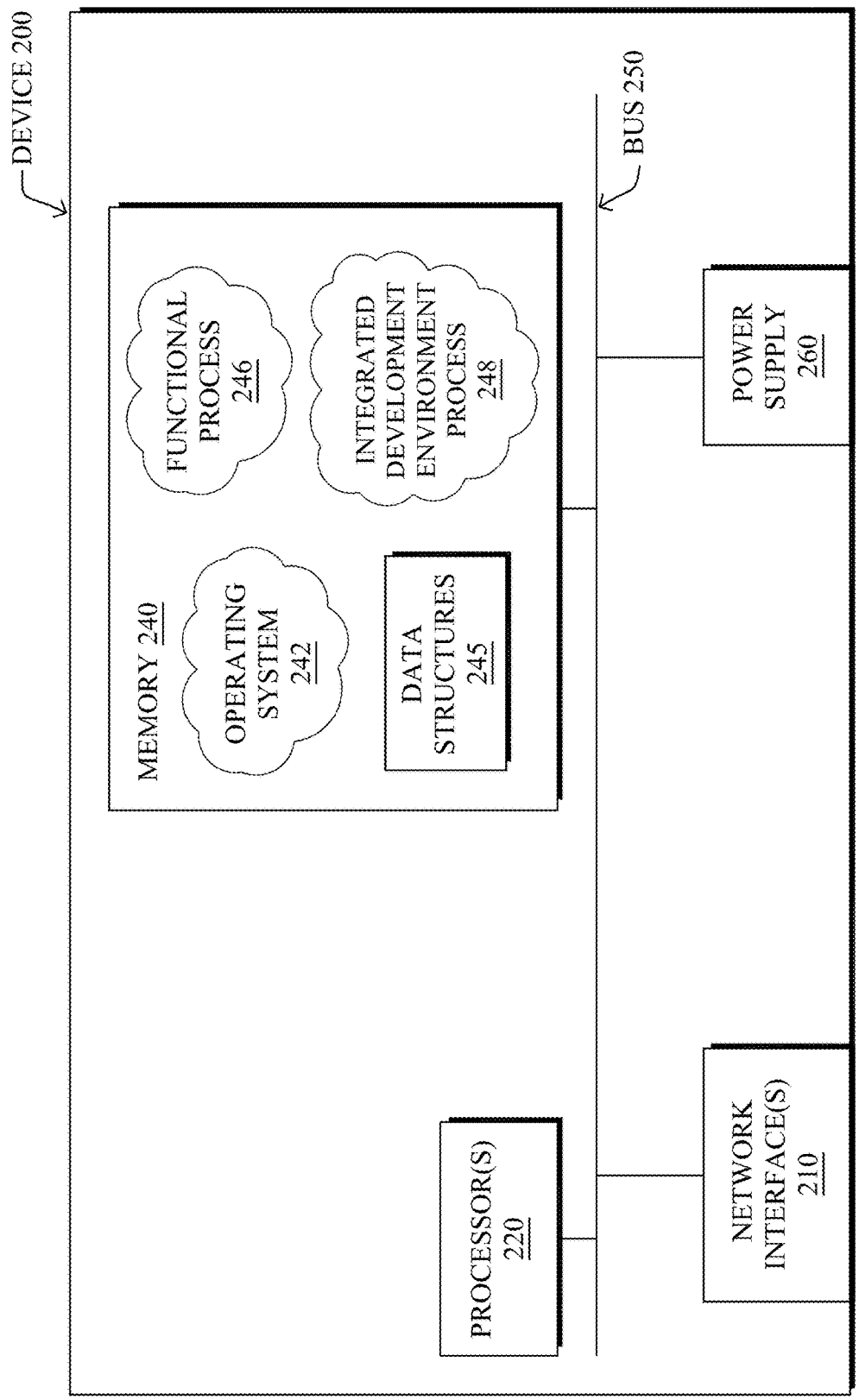
FIG. 2 illustrates an example computing device/node.

FIG. 2 is a schematic block diagram of an example computing device 200 that may be used with one or more embodiments described herein, e.g., as any of the devices shown in FIG. 1 above, and particularly as specific devices as described further below. The device may comprise one or more network interfaces 210 (e.g., wired, wireless, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links coupled to the network 100, e.g., providing a data connection between device 200 and the data network, such as the Internet. The network interfaces may be configured to transmit and/or receive data using a variety of different communication protocols. For example, interfaces 210 may include wired transceivers, wireless transceivers, cellular transceivers, or the like, each to allow device 200 to communicate information to and from a remote computing device or server over an appropriate network. The same network interfaces 210 also allow communities of multiple devices 200 to interconnect among themselves, either peer-to-peer, or up and down a hierarchy. Note, further, that the nodes may have two different types of network connections 210, e.g., wireless and wired/physical connections, and that the view herein is merely for illustration. Also, while the network interface 210 is shown separately from power supply 260, for devices using powerline communication (PLC) or Power over Ethernet (PoE), the network interface 210 may communicate through the power supply 260, or may be an integral component of the power supply.

The memory 240 comprises a plurality of storage locations that are addressable by the processor 220 and the network interfaces 210 for storing software programs and data structures associated with the embodiments described herein. The processor 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in support of software processes and/or services executing on the device. These software processes and/or services may comprise one or more functional processes 246, and on certain devices, an illustrative "Integrated Development Environment" process 248, as described herein. Notably, functional processes 246, when executed by processor(s) 220, cause each particular device 200 to perform the various functions corresponding to the particular device's purpose and general configuration. For example, a router would be configured to operate as a router, a server would be configured to operate as a server, an access point (or gateway) would be configured to operate as an access point (or gateway), and so on.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

——Application Intelligence Platform——

The Internet and the World Wide Web have enabled the proliferation of web services available for virtually all types of businesses. Due to the accompanying complexity of the infrastructure supporting the web services, it is becoming increasingly difficult to maintain the highest level of service performance and user experience to keep up with the increase in web services. For example, it can be challenging to piece together monitoring and logging data across disparate systems, tools, and layers in a network architecture. Moreover, even when data can be obtained, it is difficult to directly connect the chain of events and cause and effect.

The embodiments herein, therefore, may relate in certain embodiments to an application intelligence platform for application performance management. In one aspect, as discussed with respect to FIGS. 3-5 below, performance within a networking environment may be monitored, specifically by monitoring applications and entities (e.g., transactions, tiers, nodes, and machines) in the networking environment using agents installed at individual machines at the entities. For example, each node can include one or more machines that perform part of the applications. The agents collect data associated with the applications of interest and associated nodes and machines where the applications are being operated. Examples of the collected data may include performance data (e.g., metrics, metadata, etc.) and topology data (e.g., indicating relationship information). The agent-collected data may then be provided to one or more servers or controllers to analyze the data.

Figure 3:
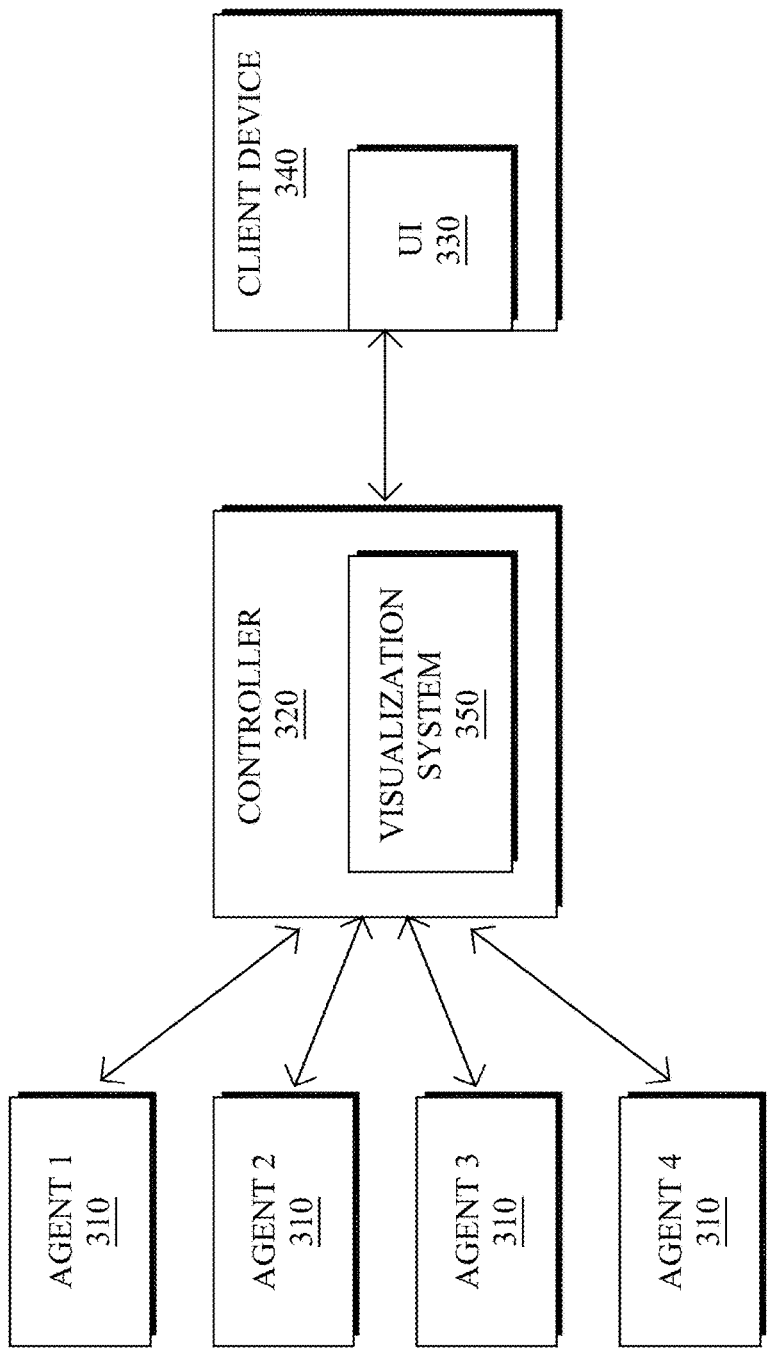
FIG. 3 illustrates an example application intelligence platform.

FIG. 3 is a block diagram of an example application intelligence platform 300 that can implement one or more aspects of the techniques herein. The application intelligence platform is a system that monitors and collects metrics of performance data for an application environment being monitored. At the simplest structure, the application intelligence platform includes one or more agents 310 and one or more servers/controllers 320. Note that while FIG. 3 shows four agents (e.g., Agent 1 through Agent 4) communicatively linked to a single controller, the total number of agents and controllers can vary based on a number of factors including the number of applications monitored, how distributed the application environment is, the level of monitoring desired, the level of user experience desired, and so on.

The controller 320 is the central processing and administration server for the application intelligence platform. The controller 320 serves a browser-based user interface (UI) 330 that is the primary interface for monitoring, analyzing, and troubleshooting the monitored environment. The controller 320 can control and manage monitoring of business transactions (described below) distributed over application servers. Specifically, the controller 320 can receive runtime data from agents 310 (and/or other coordinator devices), associate portions of business transaction data, communicate with agents to configure collection of runtime data, and provide performance data and reporting through the interface 330. The interface 330 may be viewed as a web-based interface viewable by a client device 340. In some implementations, a client device 340 can directly communicate with controller 320 to view an interface for monitoring data. The controller 320 can include a visualization system 350 for displaying the reports and dashboards related to the disclosed technology. In some implementations, the visualization system 350 can be implemented in a separate machine (e.g., a server) different from the one hosting the controller 320.

Notably, in an illustrative Software as a Service (SaaS) implementation, a controller instance 320 may be hosted remotely by a provider of the application intelligence platform 300. In an illustrative on-premise (On-Prem) implementation, a controller instance 320 may be installed locally and self-administered.

The controllers 320 receive data from different agents 310 (e.g., Agents 1-4) deployed to monitor applications, databases and database servers, servers, and end user clients for the monitored environment. Any of the agents 310 can be implemented as different types of agents with specific monitoring duties. For example, application agents may be installed on each server that hosts applications to be monitored. Instrumenting an agent adds an application agent into the runtime process of the application.

Database agents, for example, may be software (e.g., a Java program) installed on a machine that has network access to the monitored databases and the controller. Database agents query the monitored databases in order to collect metrics and pass those metrics along for display in a metric browser (e.g., for database monitoring and analysis within databases pages of the controller's UI 330). Multiple database agents can report to the same controller. Additional database agents can be implemented as backup database agents to take over for the primary database agents during a failure or planned machine downtime. The additional database agents can run on the same machine as the primary agents or on different machines. A database agent can be deployed in each distinct network of the monitored environment. Multiple database agents can run under different user accounts on the same machine.

Standalone machine agents, on the other hand, may be standalone programs (e.g., standalone Java programs) that collect hardware-related performance statistics from the servers (or other suitable devices) in the monitored environment. The standalone machine agents can be deployed on machines that host application servers, database servers, messaging servers, Web servers, etc. A standalone machine agent has an extensible architecture (e.g., designed to accommodate changes).

End user monitoring (EUM) may be performed using browser agents and mobile agents to provide performance information from the point of view of the client, such as a web browser or a mobile native application. Through EUM, web use, mobile use, or combinations thereof (e.g., by real users or synthetic agents) can be monitored based on the monitoring needs. Notably, browser agents (e.g., agents 310) can include Reporters that report monitored data to the controller.

Browser agents and mobile agents are generally unlike other monitoring through application agents, database agents, and standalone machine agents that are on the server. In particular, browser agents may generally be embodied as small files using web-based technologies, such as JavaScript agents injected into each instrumented web page (e.g., as close to the top as possible) as the web page is served, and are configured to collect data. Once the web page has completed loading, the collected data may be bundled into a beacon and sent to an EUM process/cloud for processing and made ready for retrieval by the controller. Browser real user monitoring (Browser RUM) provides insights into the performance of a web application from the point of view of a real or synthetic end user. For example, Browser RUM can determine how specific Ajax or iframe calls are slowing down page load time and how server performance impact end user experience in aggregate or in individual cases.

A mobile agent, on the other hand, may be a small piece of highly performant code that gets added to the source of the mobile application. Mobile RUM provides information on the native mobile application (e.g., iOS or Android applications) as the end users actually use the mobile application. Mobile RUM provides visibility into the functioning of the mobile application itself and the mobile application's interaction with the network used and any server-side applications with which the mobile application communicates.

Application Intelligence Monitoring: The disclosed technology can provide application intelligence data by monitoring an application environment that includes various services such as web applications served from an application server (e.g., Java virtual machine (JVM), Internet Information Services (IIS), Hypertext Preprocessor (PHP) Web server, etc.), databases or other data stores, and remote services such as message queues and caches. The services in the application environment can interact in various ways to provide a set of cohesive user interactions with the application, such as a set of user services applicable to end user customers.

Application Intelligence Modeling: Entities in the application environment (such as the JBoss service, MQSeries modules, and databases) and the services provided by the entities (such as a login transaction, service or product search, or purchase transaction) may be mapped to an application intelligence model. In the application intelligence model, a business transaction represents a particular service provided by the monitored environment. For example, in an e-commerce application, particular real-world services can include a user logging in, searching for items, or adding items to the cart. In a content portal, particular real-world services can include user requests for content such as sports, business, or entertainment news. In a stock trading application, particular real-world services can include operations such as receiving a stock quote, buying, or selling stocks.

Business Transactions: A business transaction representation of the particular service provided by the monitored environment provides a view on performance data in the context of the various tiers that participate in processing a particular request. A business transaction, which may each be identified by a unique business transaction identification (ID), represents the end-to-end processing path used to fulfill a service request in the monitored environment (e.g., adding items to a shopping cart, storing information in a database, purchasing an item online, etc.). Thus, a business transaction is a type of user-initiated action in the monitored environment defined by an entry point and a processing path across application servers, databases, and potentially many other infrastructure components. Each instance of a business transaction is an execution of that transaction in response to a particular user request (e.g., a socket call, illustratively associated with the TCP layer). A business transaction can be created by detecting incoming requests at an entry point and tracking the activity associated with request at the originating tier and across distributed components in the application environment (e.g., associating the business transaction with a 4-tuple of a source IP address, source port, destination IP address, and destination port). A flow map can be generated for a business transaction that shows the touch points for the business transaction in the application environment. In one embodiment, a specific tag may be added to packets by application specific agents for identifying business transactions (e.g., a custom header field attached to an HTTP payload by an application agent, or by a network agent when an application makes a remote socket call), such that packets can be examined by network agents to identify the business transaction identifier (ID) (e.g., a Globally Unique Identifier (GUID) or Universally Unique Identifier (UUID)).

Performance monitoring can be oriented by business transaction to focus on the performance of the services in the application environment from the perspective of end users. Performance monitoring based on business transactions can provide information on whether a service is available (e.g., users can log in, check out, or view their data), response times for users, and the cause of problems when the problems occur.

A business application is the top-level container in the application intelligence model. A business application contains a set of related services and business transactions. In some implementations, a single business application may be needed to model the environment. In some implementations, the application intelligence model of the application environment can be divided into several business applications. Business applications can be organized differently based on the specifics of the application environment. One consideration is to organize the business applications in a way that reflects work teams in a particular organization, since role-based access controls in the Controller UI are oriented by business application.

A node in the application intelligence model corresponds to a monitored server or JVM in the application environment. A node is the smallest unit of the modeled environment. In general, a node corresponds to an individual application server, JVM, or Common Language Runtime (CLR) on which a monitoring Agent is installed. Each node identifies itself in the application intelligence model. The Agent installed at the node is configured to specify the name of the node, tier, and business application under which the Agent reports data to the Controller.

Business applications contain tiers, the unit in the application intelligence model that includes one or more nodes. Each node represents an instrumented service (such as a web application). While a node can be a distinct application in the application environment, in the application intelligence model, a node is a member of a tier, which, along with possibly many other tiers, make up the overall logical business application.

Tiers can be organized in the application intelligence model depending on a mental model of the monitored application environment. For example, identical nodes can be grouped into a single tier (such as a cluster of redundant servers). In some implementations, any set of nodes, identical or not, can be grouped for the purpose of treating certain performance metrics as a unit into a single tier.

The traffic in a business application flows among tiers and can be visualized in a flow map using lines among tiers. In addition, the lines indicating the traffic flows among tiers can be annotated with performance metrics. In the application intelligence model, there may not be any interaction among nodes within a single tier. Also, in some implementations, an application agent node cannot belong to more than one tier. Similarly, a machine agent cannot belong to more than one tier. However, more than one machine agent can be installed on a machine.

A backend is a component that participates in the processing of a business transaction instance. A backend is not instrumented by an agent. A backend may be a web server, database, message queue, or other type of service. The agent recognizes calls to these backend services from instrumented code (called exit calls). When a service is not instrumented and cannot continue the transaction context of the call, the agent determines that the service is a backend component. The agent picks up the transaction context at the response at the backend and continues to follow the context of the transaction from there.

Performance information is available for the backend call. For detailed transaction analysis for the leg of a transaction processed by the backend, the database, web service, or other application need to be instrumented.

The application intelligence platform uses both self-learned baselines and configurable thresholds to help identify application issues. A complex distributed application has a large number of performance metrics and each metric is important in one or more contexts. In such environments, it is difficult to determine the values or ranges that are normal for a particular metric; set meaningful thresholds on which to base and receive relevant alerts; and determine what is a "normal" metric when the application or infrastructure undergoes change. For these reasons, the disclosed application intelligence platform can perform anomaly management based on dynamic baselines or thresholds.

The disclosed application intelligence platform automatically calculates dynamic baselines for the monitored metrics, defining what is "normal" for each metric based on actual usage. The application intelligence platform uses these baselines to identify subsequent metrics whose values fall out of this normal range. Static thresholds that are tedious to set up and, in rapidly changing application environments, error-prone, are no longer needed.

The disclosed application intelligence platform can use configurable thresholds to maintain service level agreements (SLAs) and ensure optimum performance levels for system by detecting slow, very slow, and stalled transactions. Configurable thresholds provide a flexible way to associate the right business context with a slow request to isolate the root cause.

In addition, health rules can be set up with conditions that use the dynamically generated baselines to trigger alerts or initiate other types of remedial actions when performance problems are occurring or may be about to occur.

For example, dynamic baselines can be used to automatically establish what is considered normal behavior for a particular application. Policies and health rules can be used against baselines or other health indicators for a particular application to detect and troubleshoot problems before users are affected. Health rules can be used to define metric conditions to monitor, such as when the "average response time is four times slower than the baseline". The health rules can be created and modified based on the monitored application environment.

Examples of health rules for testing business transaction performance can include business transaction response time and business transaction error rate. For example, health rule that tests whether the business transaction response time is much higher than normal can define a critical condition as the combination of an average response time greater than the default baseline by 3 standard deviations and a load greater than 50 calls per minute. In some implementations, this health rule can define a warning condition as the combination of an average response time greater than the default baseline by 2 standard deviations and a load greater than 100 calls per minute. In some implementations, the health rule that tests whether the business transaction error rate is much higher than normal can define a critical condition as the combination of an error rate greater than the default baseline by 3 standard deviations and an error rate greater than 10 errors per minute and a load greater than 50 calls per minute. In some implementations, this health rule can define a warning condition as the combination of an error rate greater than the default baseline by 2 standard deviations and an error rate greater than 5 errors per minute and a load greater than 50 calls per minute. These are non-exhaustive and non-limiting examples of health rules and other health rules can be defined as desired by the user.

Policies can be configured to trigger actions when a health rule is violated or when any event occurs. Triggered actions can include notifications, diagnostic actions, auto-scaling capacity, running remediation scripts.

Most of the metrics relate to the overall performance of the application or business transaction (e.g., load, average response time, error rate, etc.) or of the application server infrastructure (e.g., percentage CPU busy, percentage of memory used, etc.). The Metric Browser in the controller UI can be used to view all of the metrics that the agents report to the controller.

In addition, special metrics called information points can be created to report on how a given business (as opposed to a given application) is performing. For example, the performance of the total revenue for a certain product or set of products can be monitored. Also, information points can be used to report on how a given code is performing, for example how many times a specific method is called and how long it is taking to execute. Moreover, extensions that use the machine agent can be created to report user defined custom metrics. These custom metrics are base-lined and reported in the controller, just like the built-in metrics.

All metrics can be accessed programmatically using a Representational State Transfer (REST) API that returns either the JavaScript Object Notation (JSON) or the eXtensible Markup Language (XML) format. Also, the REST API can be used to query and manipulate the application environment.

Snapshots provide a detailed picture of a given application at a certain point in time. Snapshots usually include call graphs that allow that enables drilling down to the line of code that may be causing performance problems. The most common snapshots are transaction snapshots.

Figure 4:
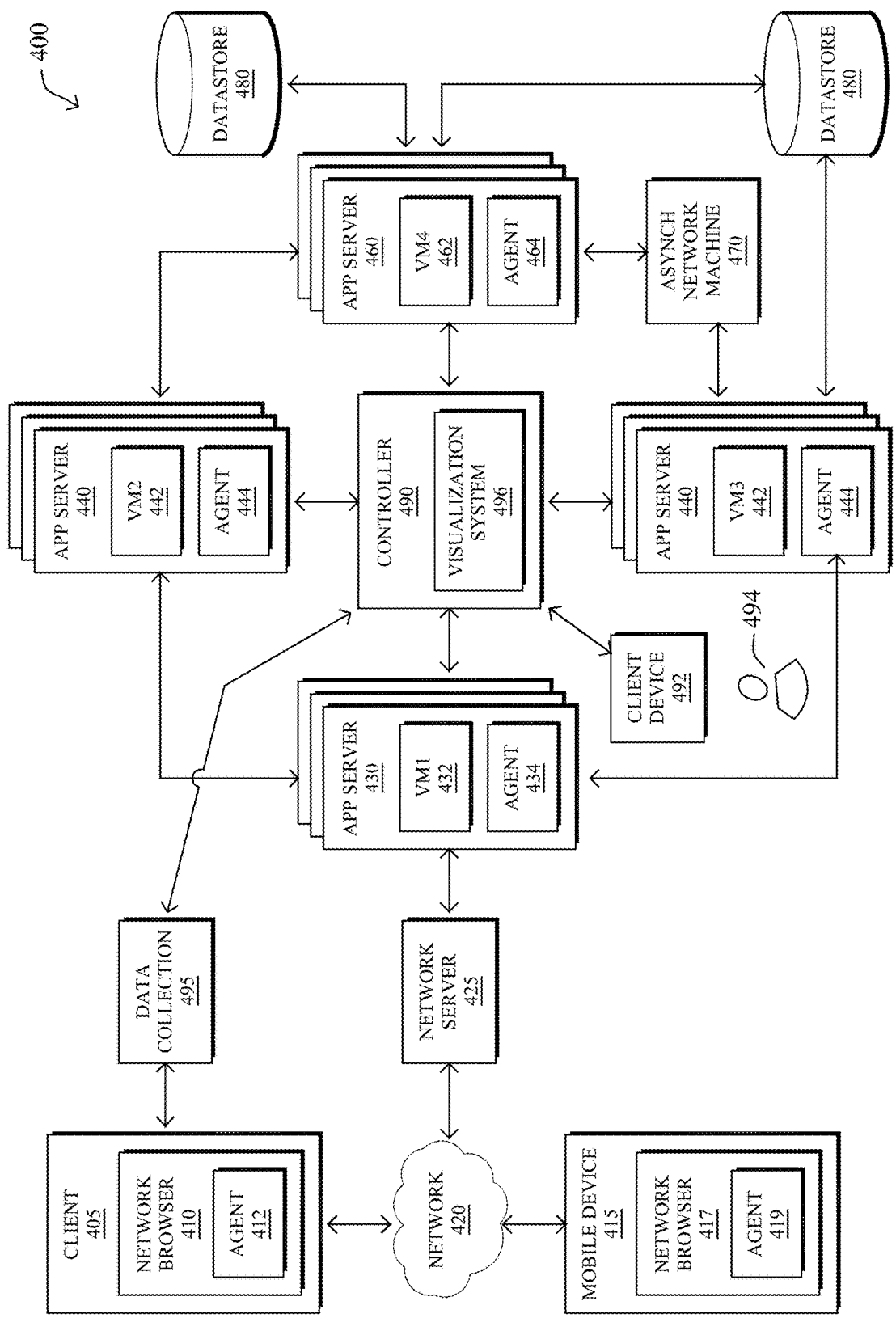
FIG. 4 illustrates an example computing network built for an application intelligence platform.

FIG. 4 illustrates an example application intelligence platform (system) 400 for performing one or more aspects of the techniques herein. The system 400 in FIG. 4 includes client device 405 and 492, mobile device 415, network 420, network server 425, application servers 430, 440, 450, and 460, asynchronous network machine 470, data stores 480 and 485, controller 490, and data collection server 495. The controller 490 can include visualization system 496 for providing displaying of the report generated for performing the field name recommendations for field extraction as disclosed in the present disclosure. In some implementations, the visualization system 496 can be implemented in a separate machine (e.g., a server) different from the one hosting the controller 490.

Client device 405 may include network browser 410 and be implemented as a computing device, such as for example a laptop, desktop, workstation, or some other computing device. Network browser 410 may be a client application for viewing content provided by an application server, such as application server 430 via network server 425 over network 420.

Network browser 410 may include agent 412. Agent 412 may be installed on network browser 410 and/or client 405 as a network browser add-on, downloading the application to the server, or in some other manner. Agent 412 may be executed to monitor network browser 410, the operating system of client 405, and any other application, API, or another component of client 405. Agent 412 may determine network browser navigation timing metrics, access browser cookies, monitor code, and transmit data to data collection 460, controller 490, or another device. Agent 412 may perform other operations related to monitoring a request or a network at client 405 as discussed herein including report generating.

Mobile device 415 is connected to network 420 and may be implemented as a portable device suitable for sending and receiving content over a network, such as for example a mobile phone, smart phone, tablet computer, or other portable device. Both client device 405 and mobile device 415 may include hardware and/or software configured to access a web service provided by network server 425.

Mobile device 415 may include network browser 417 and an agent 419. Mobile device may also include client applications and other code that may be monitored by agent 419. Agent 419 may reside in and/or communicate with network browser 417, as well as communicate with other applications, an operating system, APIs and other hardware and software on mobile device 415. Agent 419 may have similar functionality as that described herein for agent 412 on client 405, and may repot data to data collection server 460 and/or controller 490.

Network 420 may facilitate communication of data among different servers, devices and machines of system 400 (some connections shown with lines to network 420, some not shown). The network may be implemented as a private network, public network, intranet, the Internet, a cellular network, Wi-Fi network, VoIP network, or a combination of one or more of these networks. The network 420 may include one or more machines such as load balance machines and other machines.

Network server 425 is connected to network 420 and may receive and process requests received over network 420. Network server 425 may be implemented as one or more servers implementing a network service, and may be implemented on the same machine as application server 430 or one or more separate machines. When network 420 is the Internet, network server 425 may be implemented as a web server.

Application server 430 communicates with network server 425, application servers 440 and 450, and controller 490. Application server 450 may also communicate with other machines and devices (not illustrated in FIG. 3). Application server 430 may host an application or portions of a distributed application. The host application 432 may be in one of many platforms, such as including a Java, PHP, .Net, and Node.JS, be implemented as a Java virtual machine, or include some other host type. Application server 430 may also include one or more agents 434 (i.e., "modules"), including a language agent, machine agent, and network agent, and other software modules. Application server 430 may be implemented as one server or multiple servers as illustrated in FIG. 4.

Application 432 and other software on application server 430 may be instrumented using byte code insertion, or byte code instrumentation (BCI), to modify the object code of the application or other software. The instrumented object code may include code used to detect calls received by application 432, calls sent by application 432, and communicate with agent 434 during execution of the application. BCI may also be used to monitor one or more sockets of the application and/or application server in order to monitor the socket and capture packets coming over the socket.

In some embodiments, server 430 may include applications and/or code other than a virtual machine. For example, servers 430, 440, 450, and 460 may each include Java code, .Net code, PHP code, Ruby code, C code, C++ or other binary code to implement applications and process requests received from a remote source. References to a virtual machine with respect to an application server are intended to be for exemplary purposes only.

Agents 434 on application server 430 may be installed, downloaded, embedded, or otherwise provided on application server 430. For example, agents 434 may be provided in server 430 by instrumentation of object code, downloading the agents to the server, or in some other manner. Agent 434 may be executed to monitor application server 430, monitor code running in a virtual machine 432 (or other program language, such as a PHP, .Net, or C program), machine resources, network layer data, and communicate with byte instrumented code on application server 430 and one or more applications on application server 430.

Each of agents 434, 444, 454, and 464 may include one or more agents, such as language agents, machine agents, and network agents. A language agent may be a type of agent that is suitable to run on a particular host. Examples of language agents include a Java agent, .Net agent, PHP agent, and other agents. The machine agent may collect data from a particular machine on which it is installed. A network agent may capture network information, such as data collected from a socket.

Agent 434 may detect operations such as receiving calls and sending requests by application server 430, resource usage, and incoming packets. Agent 434 may receive data, process the data, for example by aggregating data into metrics, and transmit the data and/or metrics to controller 490. Agent 434 may perform other operations related to monitoring applications and application server 430 as discussed herein. For example, agent 434 may identify other applications, share business transaction data, aggregate detected runtime data, and other operations.

An agent may operate to monitor a node, tier or nodes or other entity. A node may be a software program or a hardware component (e.g., memory, processor, and so on). A tier of nodes may include a plurality of nodes which may process a similar business transaction, may be located on the same server, may be associated with each other in some other way, or may not be associated with each other.

A language agent may be an agent suitable to instrument or modify, collect data from, and reside on a host. The host may be a Java, PHP, .Net, Node.JS, or other type of platform. Language agent may collect flow data as well as data associated with the execution of a particular application. The language agent may instrument the lowest level of the application to gather the flow data. The flow data may indicate which tier is communicating with which tier and on which port. In some instances, the flow data collected from the language agent includes a source IP, a source port, a destination IP, and a destination port. The language agent may report the application data and call chain data to a controller. The language agent may report the collected flow data associated with a particular application to a network agent.

A network agent may be a standalone agent that resides on the host and collects network flow group data. The network flow group data may include a source IP, destination port, destination IP, and protocol information for network flow received by an application on which network agent is installed. The network agent may collect data by intercepting and performing packet capture on packets coming in from one or more sockets. The network agent may receive flow data from a language agent that is associated with applications to be monitored. For flows in the flow group data that match flow data provided by the language agent, the network agent rolls up the flow data to determine metrics such as TCP throughput, TCP loss, latency, and bandwidth. The network agent may then report the metrics, flow group data, and call chain data to a controller. The network agent may also make system calls at an application server to determine system information, such as for example a host status check, a network status check, socket status, and other information.

A machine agent may reside on the host and collect information regarding the machine which implements the host. A machine agent may collect and generate metrics from information such as processor usage, memory usage, and other hardware information.

Each of the language agent, network agent, and machine agent may report data to the controller. Controller 490 may be implemented as a remote server that communicates with agents located on one or more servers or machines. The controller may receive metrics, call chain data and other data, correlate the received data as part of a distributed transaction, and report the correlated data in the context of a distributed application implemented by one or more monitored applications and occurring over one or more monitored networks. The controller may provide reports, one or more user interfaces, and other information for a user.

Agent 434 may create a request identifier for a request received by server 430 (for example, a request received by a client 405 or 415 associated with a user or another source). The request identifier may be sent to client 405 or mobile device 415, whichever device sent the request. In embodiments, the request identifier may be created when a data is collected and analyzed for a particular business transaction.

Each of application servers 440, 450, and 460 may include an application and agents. Each application may run on the corresponding application server. Each of applications 442, 452, and 462 on application servers 440-460 may operate similarly to application 432 and perform at least a portion of a distributed business transaction. Agents 444, 454, and 464 may monitor applications 442-462, collect and process data at runtime, and communicate with controller 490. The applications 432, 442, 452, and 462 may communicate with each other as part of performing a distributed transaction. Each application may call any application or method of another virtual machine.

Asynchronous network machine 470 may engage in asynchronous communications with one or more application servers, such as application server 450 and 460. For example, application server 450 may transmit several calls or messages to an asynchronous network machine. Rather than communicate back to application server 450, the asynchronous network machine may process the messages and eventually provide a response, such as a processed message, to application server 460. Because there is no return message from the asynchronous network machine to application server 450, the communications among them are asynchronous.

Data stores 480 and 485 may each be accessed by application servers such as application server 450. Data store 485 may also be accessed by application server 450. Each of data stores 480 and 485 may store data, process data, and return queries received from an application server. Each of data stores 480 and 485 may or may not include an agent.

Controller 490 may control and manage monitoring of business transactions distributed over application servers 430-460. In some embodiments, controller 490 may receive application data, including data associated with monitoring client requests at client 405 and mobile device 415, from data collection server 460. In some embodiments, controller 490 may receive application monitoring data and network data from each of agents 412, 419, 434, 444, and 454 (also referred to herein as "application monitoring agents"). Controller 490 may associate portions of business transaction data, communicate with agents to configure collection of data, and provide performance data and reporting through an interface. The interface may be viewed as a web-based interface viewable by client device 492, which may be a mobile device, client device, or any other platform for viewing an interface provided by controller 490. In some embodiments, a client device 492 may directly communicate with controller 490 to view an interface for monitoring data.

Client device 492 may include any computing device, including a mobile device or a client computer such as a desktop, work station or other computing device. Client computer 492 may communicate with controller 390 to create and view a custom interface. In some embodiments, controller 490 provides an interface for creating and viewing the custom interface as a content page, e.g., a web page, which may be provided to and rendered through a network browser application on client device 492.

Applications 432, 442, 452, and 462 may be any of several types of applications. Examples of applications that may implement applications 432-462 include a Java, PHP, .Net, Node.JS, and other applications.

Figure 5:
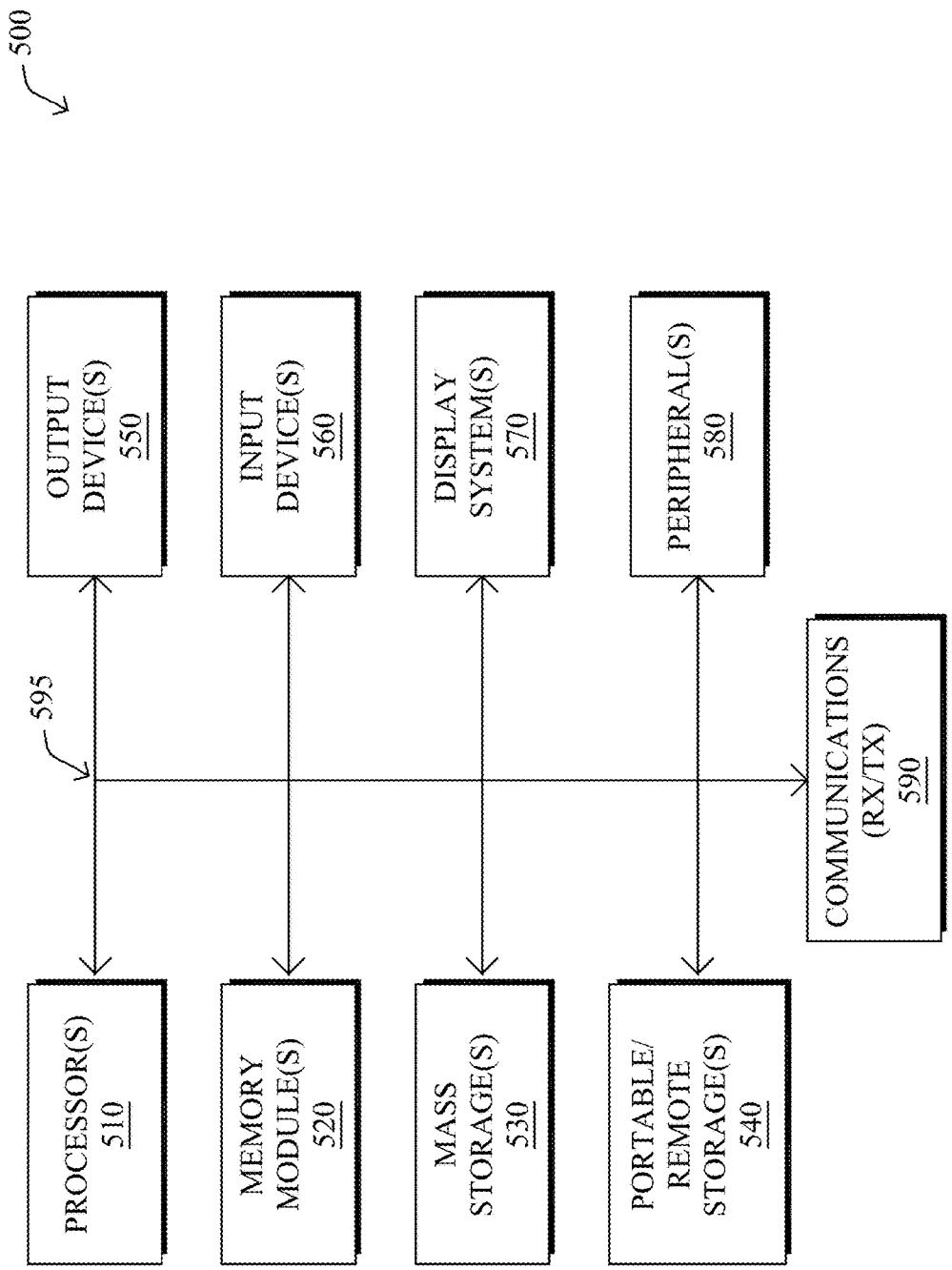
FIG. 5 illustrates an example computing system implementing portions of the disclosed technology.

FIG. 5 is a block diagram of a computer system 500 for implementing the present technology, which is a specific implementation of device 200 of FIG. 2 above. System 500 of FIG. 5 may be implemented in the contexts of the likes of clients 405, 492, network server 425, servers 430, 440, 450, 460, a synchronous network machine 470, and controller 490 of FIG. 4. (Note that the specifically configured system 500 of FIG. 5 and the customized device 200 of FIG. 2 are not meant to be mutually exclusive, and the techniques herein may be performed by any suitably configured computing device.)

The computing system 500 of FIG. 5 includes one or more processors 510 and memory 520. Main memory 520 stores, in part, instructions and data for execution by processor 510. Main memory 510 can store the executable code when in operation. The system 500 of FIG. 5 further includes a mass storage device 530, portable storage medium drive(s) 540, output devices 550, user input devices 560, a graphics display 570, and peripheral devices 580.

The components shown in FIG. 5 are depicted as being connected via a single bus 590. However, the components may be connected through one or more data transport means. For example, processor unit 510 and main memory 520 may be connected via a local microprocessor bus, and the mass storage device 530, peripheral device(s) 580, portable or remote storage device 540, and display system 570 may be connected via one or more input/output (I/O) buses.

Mass storage device 530, which may be implemented with a magnetic disk drive or an optical disk drive, is a non-volatile storage device for storing data and instructions for use by processor unit 510. Mass storage device 530 can store the system software for implementing embodiments of the present invention for purposes of loading that software into main memory 520.

Portable storage device 540 operates in conjunction with a portable non-volatile storage medium, such as a compact disk, digital video disk, magnetic disk, flash storage, etc. to input and output data and code to and from the computer system 500 of FIG. 5. The system software for implementing embodiments of the present invention may be stored on such a portable medium and input to the computer system 500 via the portable storage device 540.

Input devices 560 provide a portion of a user interface. Input devices 560 may include an alpha-numeric keypad, such as a keyboard, for inputting alpha-numeric and other information, or a pointing device, such as a mouse, a trackball, stylus, or cursor direction keys. Additionally, the system 500 as shown in FIG. 5 includes output devices 550. Examples of suitable output devices include speakers, printers, network interfaces, and monitors.

Display system 570 may include a liquid crystal display (LCD) or other suitable display device. Display system 570 receives textual and graphical information, and processes the information for output to the display device.

Peripherals 580 may include any type of computer support device to add additional functionality to the computer system. For example, peripheral device(s) 580 may include a modem or a router.

The components contained in the computer system 500 of FIG. 5 can include a personal computer, hand held computing device, telephone, mobile computing device, workstation, server, minicomputer, mainframe computer, or any other computing device. The computer can also include different bus configurations, networked platforms, multi-processor platforms, etc. Various operating systems can be used including Unix, Linux, Windows, Apple OS, and other suitable operating systems, including mobile versions.

When implementing a mobile device such as smart phone or tablet computer, the computer system 500 of FIG. 5 may include one or more antennas, radios, and other circuitry for communicating over wireless signals, such as for example communication using Wi-Fi, cellular, or other wireless signals.

——Runtime Intelligence within an IDE——

As noted above, software developers today are quickly pushing code into to production, using micro-service architectures and other technologies. Typically, developers use what's called an "integrated development (or developer) environment" (IDE), which is a software application that provides comprehensive facilities to computer programmers for software development. IDEs help developers create and test software code (e.g., applications) in an environment with a source code editor, build automation tools, and often built-in debuggers and even intelligent code completion.

Figure 6:
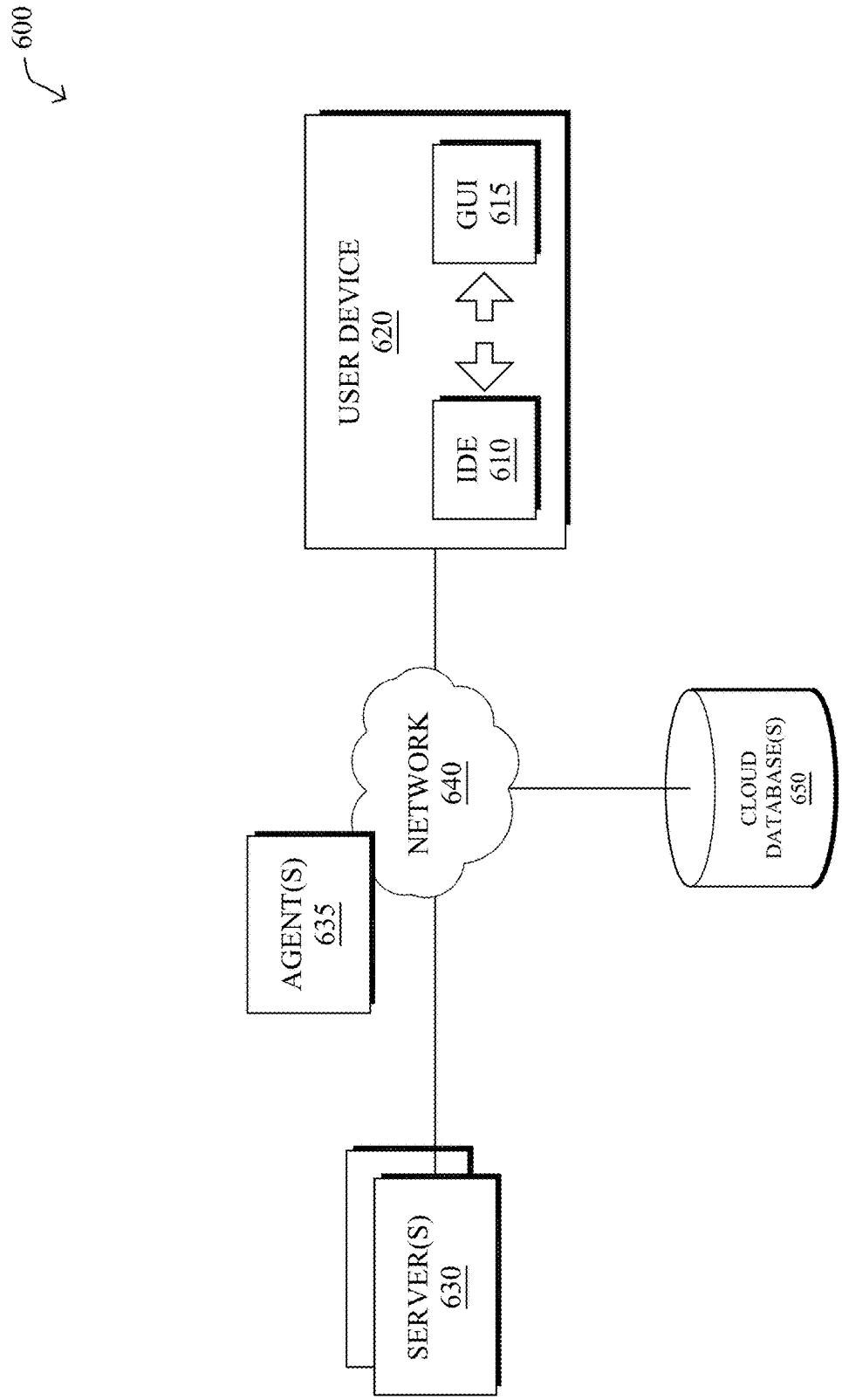
FIG. 6 illustrates an example simplified software development environment having an integrated development environment (IDE)

FIG. 6 illustrates an example simplified software development environment 600, where an integrated development environment (IDE) 610 may be employed on (or at least displayed on, in the case of IDEs serviced in the Cloud) a user device 620, such as a personal computer, laptop, mobile, and so on. Integrated development environments (IDEs) 610 are designed to maximize programmer productivity, and are generally a single program in which all development is done (e.g., authoring, modifying, compiling, deploying, and debugging software). Notably, though the techniques herein primarily reference IDEs, other software development tools may also be configured to employ certain aspects of the techniques herein. IDEs 610 also have an associated graphical user interface (GUI) 615 (displayed on the user device 620), which may be based on images (e.g., function icons and linking) or text/code-based, or both.

Software development environment 600 may also comprise one or more servers 630 over network 640, such as for storing libraries, languages, open source code, drivers, and so on, for integration with the IDE 610. Cloud databases 650 may also provide similar services/information, as will be appreciated by those skilled in the art. Certain servers 630 and/or databases 650 may be specifically configured to provide various performance metrics, such as calculated metrics, measured metrics (e.g., in correlation with one or more agents 635 dispersed throughout the network 640). In the fields of information technology (IT) and systems management, for example, application performance management (APM) is the monitoring and management of performance and availability of software applications (e.g., the translation of IT metrics into business meaning/value). The application intelligence platform described above is one specific example of APM, though many types exist. APM servers 630 (controllers, systems of servers and agents, etc.), therefore, generally monitor performance metrics in terms of both end-user experience (e.g., average response times, latencies, network performance metrics, communication quality, etc.) and computational resources (e.g., bandwidth, throughput, capacity, memory usage, data loss, errors, and so on) at various locations throughout the environment 600. Said differently, APM may be used for i) end-user (or digital) experience monitoring (both active and passive), ii) application discovery, tracing, and diagnostics (ADTD) (e.g., a combination of application runtime architecture discovery and modeling, user-defined transaction profiling (also called business transaction management), and application component monitoring), and iii) application analytics.

As further mentioned above, software developers currently are limited in their ability to determine exactly what the cause of a problematic software code is, or else to assess whether their working software code is inefficient. For example, without being loaded by computer-based demands for searches, calculations, transmissions, etc., most applications are fast enough, which is why programmers may not catch performance problems during development. Although software developers write unit tests to evaluate the functional and logical correctness of software programs, they are still limited by the fact that they can't reproduce real world scenarios and load that will occur in a production environment to test their software while in development or in staging. So incidents happen in production and remediation or bug fixing happens in a reactive manner today. Software developers do not currently have ready access to performance metrics of their codebase at the level of classes and methods in staging and production environments. To achieve that level of access, developers currently have to log into APM tools running in production with tight access controls, and even then would have to manually analyze and mine the snapshots and stack-traces in a cumbersome manner to troubleshoot production incidents resulting in extended downtime and poor customer experiences. Another alternative is for the programmer to write a "profiler" program to simulate their software code. Those skilled in the art, however, will understand that profilers are impractical, often intensive codes with large overhead (e.g., a hundred steps of profiler code for ten steps of program code), and that they often cannot account for real-world unpredicted errors (e.g., typos, alpha inputs instead of numeric inputs, or other just plain unexpected events).

The techniques herein, therefore, propose a mechanism for runtime intelligence within an IDE. In particular, since developers spend most of their time HO % or more) in their IDEs, the techniques herein gather and/or estimate performance metrics and other key statistics at the level of classes and methods, and present them to developers right in their IDEs. As described below, for example, various aspects of the embodiments herein may entail certain features, such as an IDE integration code review tool integration, a snapshot and metric miner (e.g., or other technique/system to gather and present metrics at the level of classes and methods that a software developer is interested in having in the IDE code editor), a multi-environment data connector (e.g., to pull performance data from multiple environments like development, staging, and production), a root cause debugger (e.g., with Git diff and stacktrace jumping for errors), a custom info point creator (e.g., to enable developers create info points for deeper level tracking), as well as predictive analytics (e.g., to estimate code change impact based on existing runtime data). Using these tools/features, the techniques herein may allow for highlighting and creating a summary of which methods and classes are performing poorly in various environments (e.g., "hotspots"). Also, the techniques herein may allow for early catching of issues, such as by comparing and contrasting various performance metrics to proactively catch issues in the development and/or staging environments, instead of waiting until production incidents. Lastly, the predictive analysis provided herein allows a developer to better understand the performance impact of particular code changes and various service dependencies.

Specifically, according to one or more embodiments of the present disclosure, techniques herein maintain an integrated development environment (IDE) on a computing device for managing software code for one or more software programs. At the IDE on the computer, runtime performance information regarding execution of the software code in the IDE is determined, the runtime performance information corresponding to individual portions of the software code. The IDE (or IDE plugin/agent/etc., described below) translates the runtime performance information into user-understandable indications of the runtime performance information, and displays the user-understandable indications of the runtime performance information in a graphical user interface (GUI) when a respective corresponding individual portion of the software code is displayed in the GUI. Alternatively a system can send all captured and mined performance metrics for all classes and methods to the IDE (or IDE plugin) in a single shot as and when they get updated. The IDE/plugin can then display only a subset of those metrics based on the current classes and methods in view in the IDE at any point in time.

Also, specifically according to one or more additional embodiments of the present disclosure, At the IDE on the computing device, one or more code changes to the software code are determined between a given version of the software code and a subsequent version of the software code, and then a performance impact of each of the one or more code changes is determined. The IDE prepares user-understandable indications of the performance impact of the one or more code changes, and displays the user-understandable indications of the performance impact in a GUI when a respective code change is displayed in the GUI.

Illustratively, the techniques described herein may be performed by hardware, software, and/or firmware, such as in accordance with the illustrative Integrated Development Environment (IDE) process 248, which may include computer executable instructions executed by the processor 220 to perform functions relating to the techniques described herein, e.g., in conjunction with corresponding processes of other devices in the computer network as described herein (e.g., as a full IDE, or as a plugin to an IDE, in collaboration with one or more servers, as s server providing information to an IDE, etc.).

Figure 7:
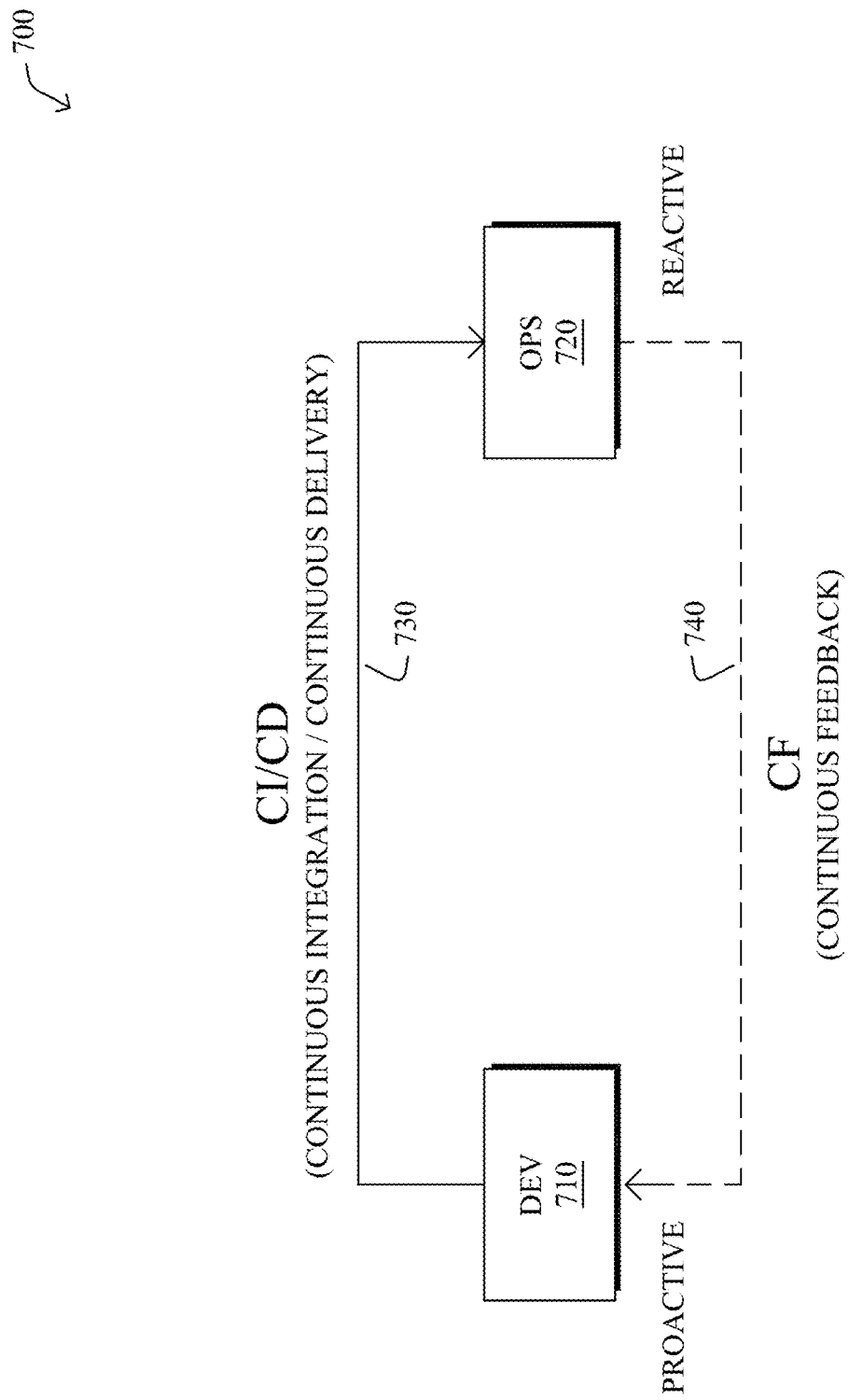
FIG. 7 illustrates an example DevOps flow diagram for providing runtime intelligence within an IDE.

Operationally, and with reference to FIG. 7 showing a high-level "DevOps" flow diagram 700 for providing runtime intelligence within an IDE, the techniques herein expand a traditional DevOps model (e.g., a development component "Dev" 710 and an operations component "Ops" 720). In particular, as will be understood in the art, software developers program software code within the Dev component 710 (e.g., within an IDE), including design, coding, testing, revising, and so on, before pushing/releasing the software code to the Ops component 720, where the software is considered to be "in production" at the consumers' computers (e.g., end-user computers, automated computing systems, etc.). The often-used approach of "continuous integration/continuous delivery" (CI/CD) 730 allows for the production of software in short cycles, ensuring that the software can be reliably released at any time. Through typical CI/CD, that is, software may be built, tested, and released faster and more frequently, allowing for more incremental updates to applications in production.

The techniques herein enhance the DevOps model by enabling developers to proactively fix issues within the Dev stage 710 (and within Staging) by supporting true DevOps by bridging Ops 720 with Dev 710 through continuous feedback (CF) 740. The embodiments described below, in particular, allow developers to view runtime metrics for their code within their IDE (where they spend most of their time), including an indication of "hotspots" of potentially problematic code, enabling developers to understand performance statistics of their codebase. The Ops 720 of software code, for instance, provides call stacks, JVM stats, thread contention, memory leaks, thrash statistics, and other runtime performance information, and as described below, a corresponding Ops console of the IDE can thus be established to provide these values in real time from Dev and staging environments, prior to an actual production push. Typical feedback in a CI/CD DevOps model is limited and slow, generally coming from user complaints, in-production error messages, and code auditing. The real-time runtime performance visualization provided by the IDE herein, on the other hand, thus provides correspondingly real-time (continuous) feedback 740 during the development stage 710 within the IDE. Notably, the IDE described herein can also automatically catch potential issues before a CI/CD production push through predictively analyzing code change impact, and can further correlate portions of code and/or code changes to business transaction intelligence in ways never before available.

Figure 8:
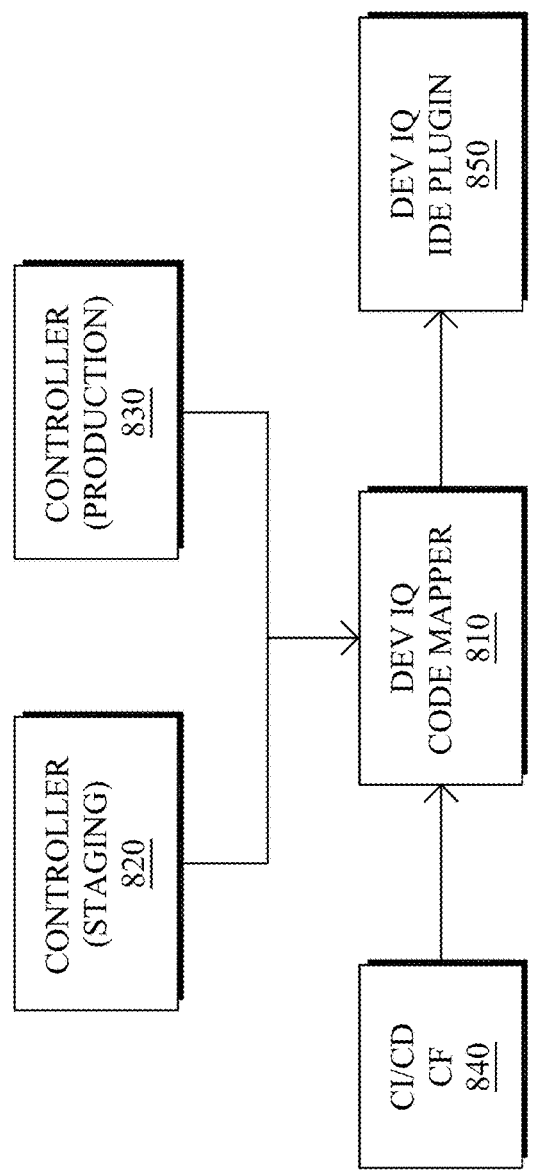
FIG. 8 illustrates an example block diagram of a product architecture for providing runtime intelligence within an IDE.

FIG. 8 illustrates an example block diagram of a product architecture 800 for providing runtime intelligence (e.g., sometimes referred to herein as "Dev IQ") within an IDE, in accordance with one or more embodiments herein. Specifically, the architecture may illustratively include a code mapper 810 that receives input from one or more controllers, such as a staging controller 820 and a production controller 830. The controllers, generally, are devices within staging or production environments that collect performance statistics from operation of software systems, such as the controller described above for the application intelligence platform. Additionally, the CF portion of the CI/CD model above may be used as input 840 to the code mapper 810, to track which version of code is deployed in which environment (dev, staging, and production) as described below. The code mapper 810, in particular, is configured to correlate individual portions of code (e.g., lines, functions, classes, methods, routines, calls, etc.) to the specific runtime performance information (e.g., latency to perform an action, delay with calling a function, round-trip-time for a data call to return a result, and so on). This information may then be shared with an IDE plugin 850, to allow an IDE to use the information as described herein. Typically IDE plugins 850 will be published in the marketplaces of relevant IDEs or appropriate channels. Alternatively, code mapper 810 can be integrated into the controller itself, in which case each controller monitoring a particular environment will report performance metrics for that environment and the IDE plugin 850 performs the aggregating of metrics across environments and the presenting of data in the GUI.

Figure 9:
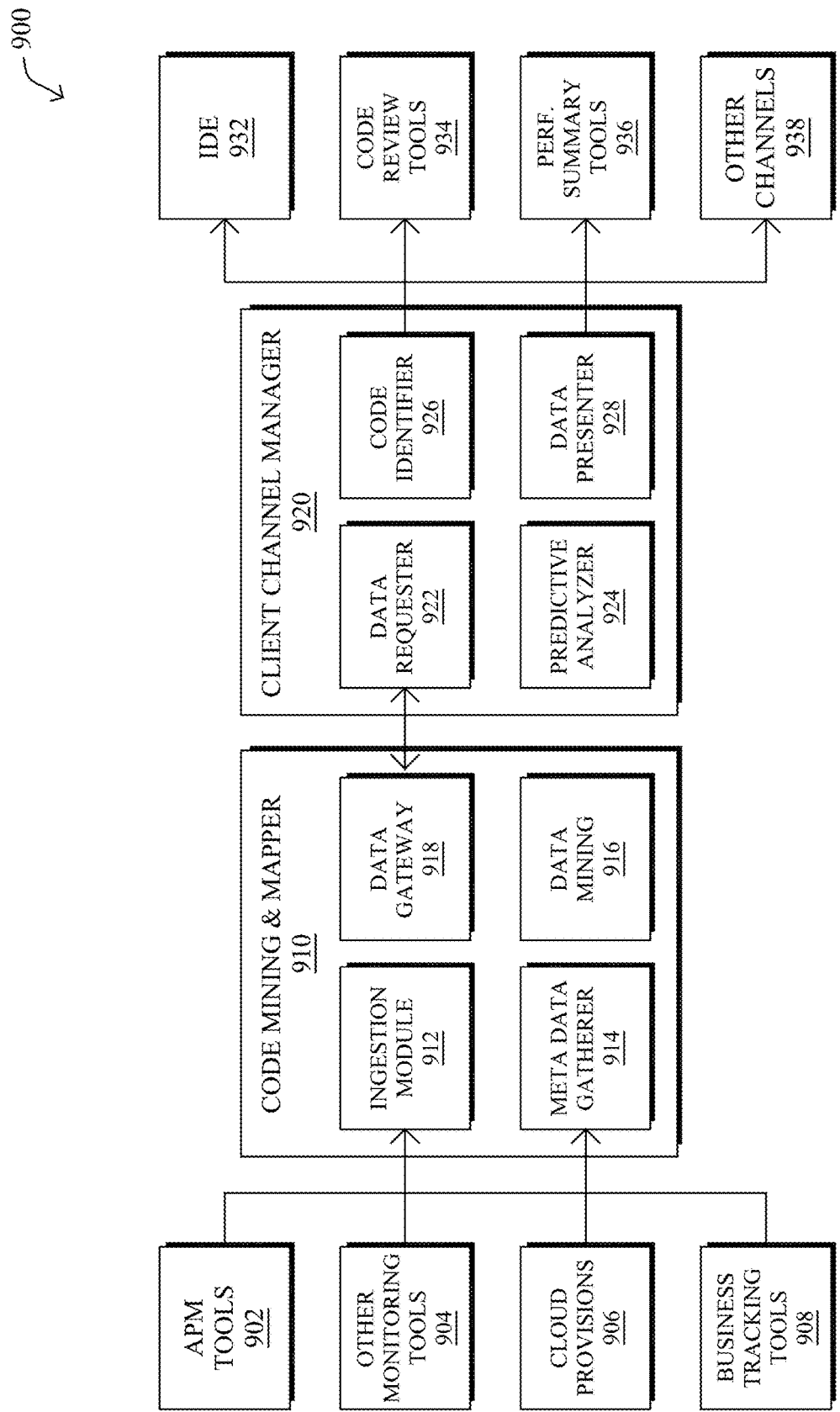
FIG. 9 illustrates an example block diagram of a system for providing runtime intelligence within an IDE.

FIG. 9 illustrates alternative (and more detailed) example block diagram of a system 900 for providing runtime intelligence (e.g., delivering intelligent summaries of analyzed runtime information) to developers within an IDE in accordance with one or more embodiments of the techniques herein. For instance, various tools, such as APM tools 902, other monitoring tools 904, cloud providers 906, business tracking tools 908, etc. may feed information into a code mining and mapper (ingestion system) 610. The ingestion system 610 is illustratively a module which connects to those various tools (e.g., APM tools, controllers, front-end error collection tools, etc.) to collect runtime data like snapshots, stack traces, call graphs, errors, timing summaries, JVM stats, thread contention details, memory leaks, and other performance statistics or monitoring data and business performance data. An ingestion module 912 of the system 910 hooks into the various collection systems, e.g., in an ad-hoc manner by catching up on data and then getting inline updates in a parallel manner for new data. A meta data gatherer 914 may be used by the ingestion system 910 to collect various meta data like code versions and environment versions, code base artifacts or commentary, etc. At the same time, meta data gatherer 914 can interface with monitoring tools 902, 904, 906, 908 to communicate bi-directionally to configure info points and other configuration variables to track more performance data based on judgment by software developers as to whether a particular class or method needs to be tracked at higher frequency or in-depth with more performance data.

The ingestion system 910 also comprises a data mining system 916, which is a module for mining and storing the different forms of data by connecting disparate data sets (e.g., and meta data), correlating them, and most importantly translating the data into different view sets, which are useful for engineering teams. In some cases the data has to be normalized based on the varying and disparate infrastructure configurations in various environments like Dev, stating, and production. For example, the Dev environment might be running locally on a PC or a Mac, while staging might be on an 8 CPU and 4 Gig RAM server, while production might be on a 16CPU, 64Gig RAM, etc. Also, performance data at the class and method level is something that developers really care about, but is not directly available today. The techniques herein, therefore, package and display such data in a user-understandable manner.

A data gateway 918 of the ingestion system 910 can then expose the different view forms (e.g., in a Representational State Transfer (REST) or GRAPH API form) to various channels (e.g., through Role-Based Access Control (RBAC) controls) to a data requester 922 of a client channel manager (channel presenter) 920, which connects to the data gateway 918 to gather relevant summaries of performance statistics as described herein.

In particular, the channel presenter 920 may be configured as a plugin to various channels that are used by engineers and developers to consume the intelligent summaries (e.g., an IDE 932, code review tools 934, performance summary tools 936, or other channels 938). Note that while the techniques herein generally reference an IDE as the primary channel of choice, the use of the term "IDE" is not meant to limit the scope of the present disclosure to one specific channel type, and thus "IDE" herein may refer to any suitable channel (e.g., 932, 934, 936, and 938), accordingly. That is, the techniques herein present performance metrics much earlier in the software life cycle; an IDE is one such place, though there can be more such tools or times where the performance information generated herein can be presented. Those channels are represented at the extreme right. Note also that typically the channel presenter 920 serving the particular channel will be published as plugin or module in the corresponding channel marketplace, which may be downloaded by the user in an IDE, installed, and then configured for authentication and access privileges to connect with channel mapper 910 or directly with monitoring tools (902,904,906,908) to fetch performance metrics and display them in the channel (e.g., a particular IDE).

Channel presenter 920 may comprise a code identifier 926, which can (locally) intelligently identify the current context of a codebase file to identify relevant components like classes, methods, and other metadata like code versions, etc. The identifier may also interact with the channel to identify code changes and other anti-patterns which can degrade performance of a code base. A data presenter 928 may present the data collected/created in the IDE or other appropriate channel in a format relevant to engineers and developers (e.g., translating to a user-understandable format). Notably, the interface between Channel presenter 920 and the suitable channel (932, 934,936,938) can illustratively be REST API or GRAPH API to communicate the relevant data and meta data.

Notably, in certain embodiments herein, a predictive analyser (analyzer) 924 may be configured herein to combine the code changes and anti-patterns from the code identifier 926 above with the data collected by data requester 922 to estimate their performance impact in an intelligent manner and deliver the summary to the data presenter 928 to present it in the channel, accordingly.

Figure 10:
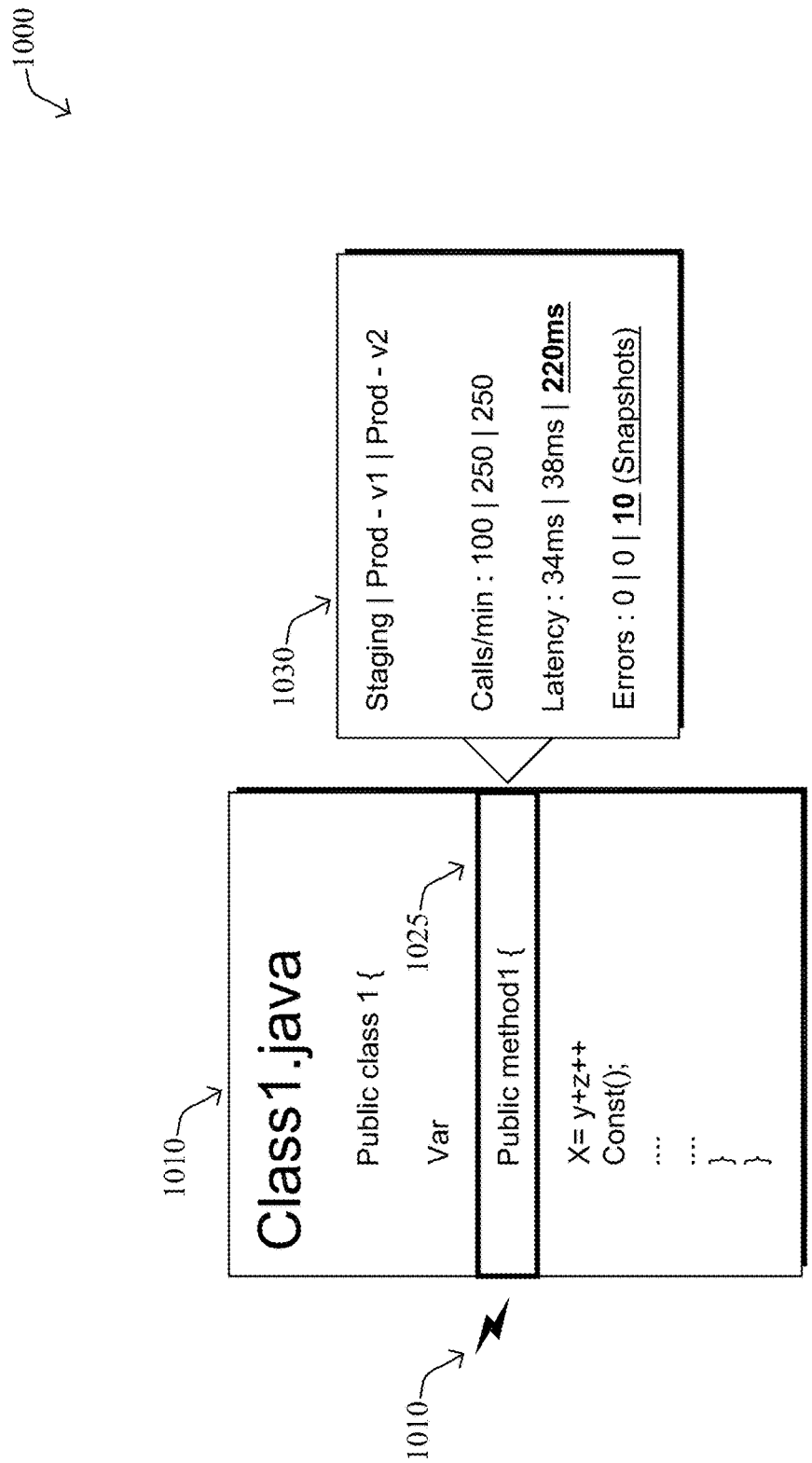
FIG. 10 illustrates an example graphical user interface (GUI) for providing runtime intelligence within an IDE.

FIG. 10 illustrates an example graphical user interface (GUI) 1000 for providing runtime intelligence within an IDE, particularly for demonstrating one or more user-understandable indications of potential problems within the code within the IDE. For instance, as shown, an example portion (e.g., snippet) 1010 of code is illustrated (e.g., Class1.java), where a particular portion of the code has an associated indicator 1020 and/or highlighting 1025 that indicates a potential problem. Upon user selection (e.g., clicking, hovering, etc.), the expansion window 1030 may open within the GUI 1000 to show further details of the highlighted line(s) of code (i.e., runtime intelligence). For example, assume that this particular function of the code ("Public method1 {"), had acceptable (end error-free) performance metrics in both the staging phase of the code and in production version 1 (Prod—v1), such as 34 ms latency for 100 calls, and 38 ms for 250 calls, respectively. However, in version 2 (Prod—v2), for some reason this portion of code now has resulted in 10 errors with an increased latency of 220 ms. The system herein can thus provide these details, optionally further pointing out (e.g., underlining, color-coding, highlighting, flashing/animating, etc.) the unacceptable metrics, so the developer can attempt to correct the problem (e.g., before it gets any worse). Note that by sharing this level of detail, the techniques herein can demonstrate trends across staging, products, and versions, and can highlight anomalies. In certain embodiments, snapshots (e.g., screenshots, log files, code points, current statistics, etc.) at the time of any errors or anomalies may also be shown within the IDE, correlate to the error/anomaly that triggered the capture of the snapshot, thus further enhancing the ability of the developer to troubleshoot any potential issues.

Figure 11:
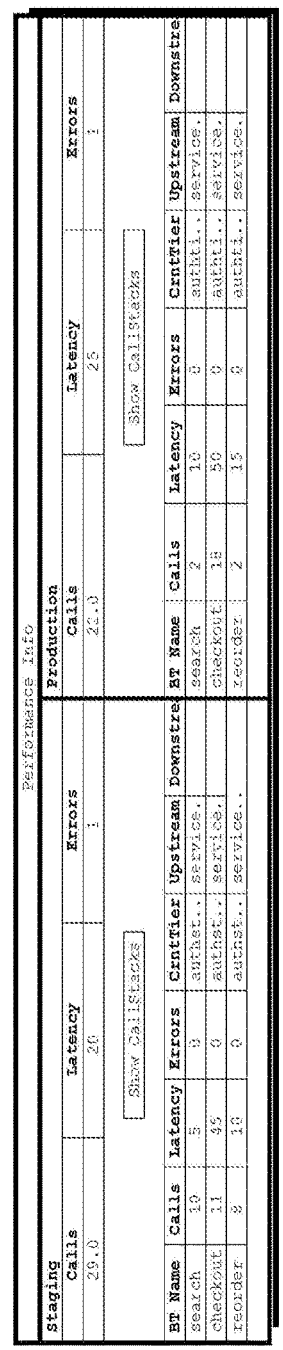
FIG. 11 illustrates an example GUI showing class and method hotspots in the IDE.

FIG. 11 illustrates an example GUI 1100 showing how the IDE herein can illustrate various class and method hotspots based on various collected and/or predicted performance information. For example, various icons, images, shapes, color-coding (e.g., red is bad, yellow is marginal, green is good, etc.) or other user-understandable indications 1110 may be used within the GUI 1100 to illustrate various performance information of the corresponding portion of code. For instance, based on a comparison to various performance baselines (e.g., past measured performance, expected performance, similar function's performance, acceptable performance, etc.), the techniques herein may make a comparison of the runtime performance information (estimates or real-time collected data) to the baselines, and can make assessments of whether that particular portion of code is operating "poorly" in comparison. This dynamic baselining thus allows for potential issues to be flagged and addressed during the testing/staging phase prior pushing the software code into final production. Alternatively the baseline can be a simple user-defined threshold (e.g., a static threshold) for the particular performance metric, to alert the user that a class or method is performing poorly. Based on either baselining methodology, a summary of all poorly performing classes and methods can be presented at an aggregate level to the user (either a software developer or their managers) so that they can drill down the specific method or class by navigating within the IDE. Users can also get alerted through in-IDE popups about poorly performing methods or classes or emails can be sent either by the IDE plugin or the backend code mapper 810 itself.

In addition, according to the techniques herein, when a user selects (clicks, hovers, etc.) a particular indication 1110, then the detailed view of the information (e.g., "drilling down" into the metrics) can be shown, such as through a pop-up window 1120, a new frame, or other manner to display the additional detail, as will be appreciated by those skilled in the art. As shown, for example, a comparison of metrics between a staging phase of the code and a production phase can be illustrated, allowing a developer to see discrepancies and to potentially debug any problematic code. Also, a user will be able to understand which critical business transactions his method or class is part of, and how the performance metrics are trending across each of their business transactions. Today, developers are blind to the fact that their particular micro-services code is being used by different micro-services and are driving several critical business transactions. With the 1120 drill down, which shows the upstream and downstream methods, developers will now get that insightful understanding of their code's overall impact (good or bad) on key business transactions. Additional data can be shown in the 1120 drill down as to how the JVM statistics are trending, thread contention details, memory leaks that are caused by the particular class or method, etc.

FIG. 12 illustrates another example GUI 1200 view showing how issues can be caught in the IDE during staging and before production. For example, indicators 1210 may again point out potentially problematic portions of code, but the window 1220 that shows the details can detect and display a potential root cause of the reason(s) for flagging that particular piece of code as a problem. For instance, as shown, the IDE can detect a code difference (e.g., new feature) 1230 and can proactively highlight this portion of code as a potential cause of the change in performance metrics.

Figure 13:
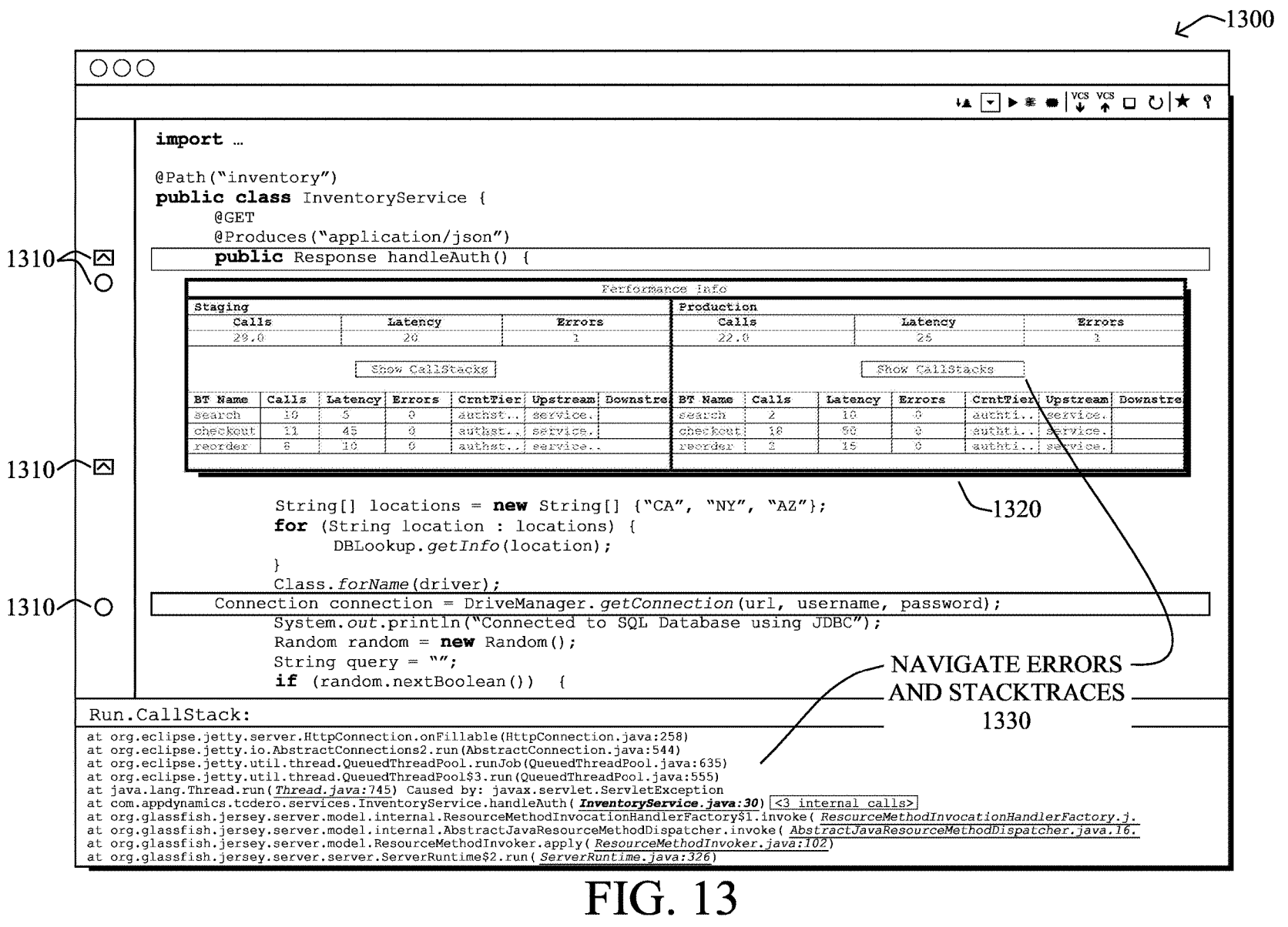

In one or more embodiments herein, the IDE can also be configured to enable stack-traces, code jumps, etc. For instance, FIG. 13 illustrates an example GUI 1300 showing again various indicators 1310 and an illustrative pop-up drill-down window 1320, along with navigation of errors and stack traces within the IDE. In particular, if there is an error, this can be correlated to an associated stack trace (correlation 1330), such that the developer can easily navigate the stack trace (traditionally a long and manual process), by navigating the linked files to determine the cause of the error, hotspot, anomaly, etc. In this manner, the software developers will be able to avoid the multiple back-and-forths between IDEs, APM tools, incident management tools to fetch the snapshots, call stacks and eventually debugging the stacktrace in the IDE.

Figure 14:
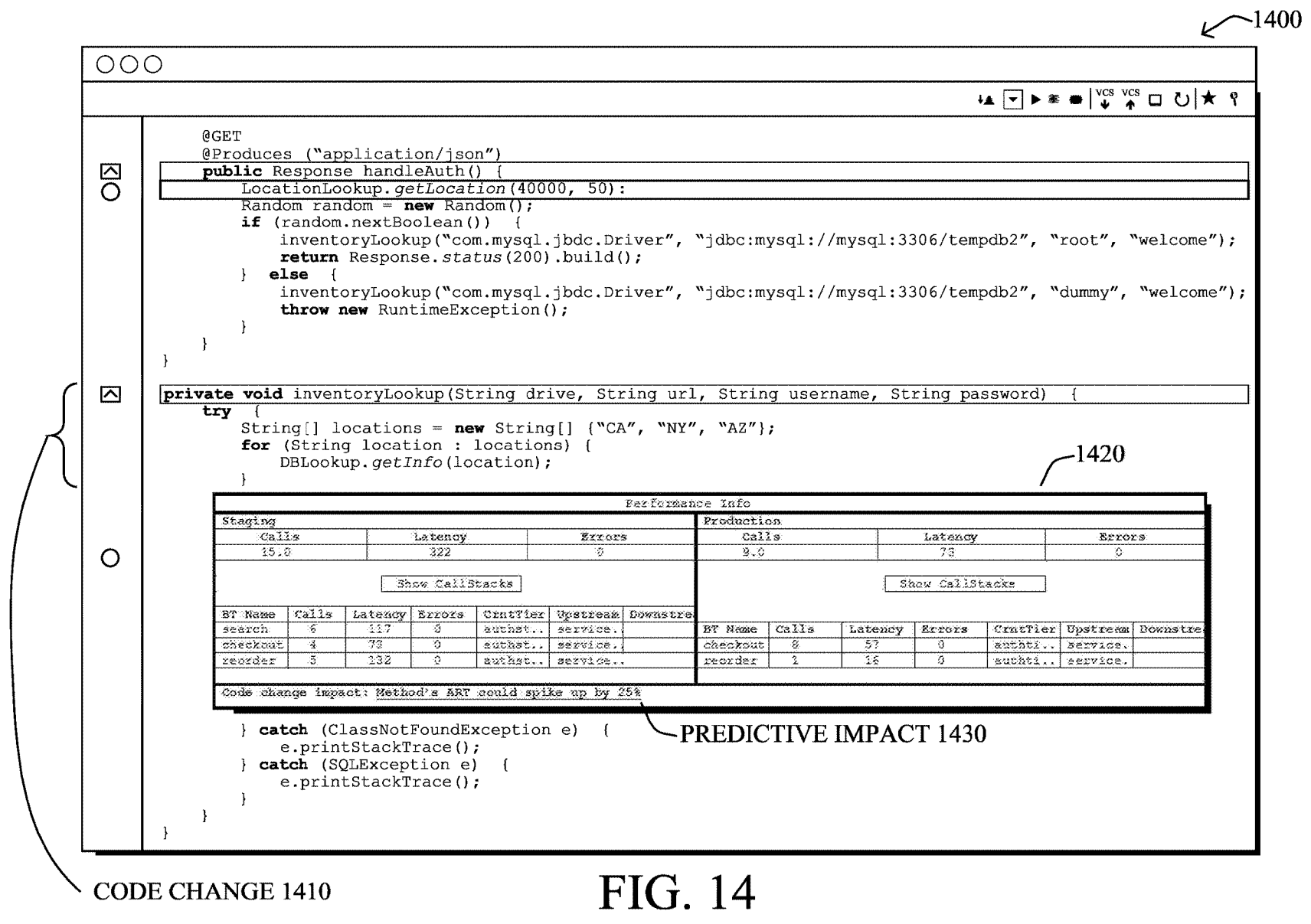

According to one or more further embodiments of the present disclosure (and described in more detail with reference to FIG. 16 below), the techniques herein may apply predictive analytics to determine the impact of a code change (new code, deleted code, anti-patterns, new function calls, new dependencies, etc.). That is, the IDE herein can detect code changes, and can predict how the code change will impact functionality of the code, and correspondingly the runtime performance information/metrics of the software. FIG. 14 illustrates an example GUI 1400 showing predictive analysis of code change impact, where certain indicated code changes 1410 may have an associated window 1420 that shows one or more indications of predicted impact 1430, such as an increase in latency, an error/loop, and so on. For instance, as described in more detail below, performance metrics associated with the change in code can be determined (e.g., estimated or based on execution of the code), and compared to baselines for the code (e.g., similar code, the code before the change, and so on). These differences may then be highlighted (1430) as a potential outcome of the code change, accordingly.

Note that in still further embodiments of the techniques herein, a business impact of a particular portion of code (e.g., as-designed, or else in response to a detected or predicted anomaly or error) can also be quantified and displayed within the GUI. That is, each portion of code can correspondingly affect various business transactions (e.g., online purchases, page visits, etc.). The techniques herein, therefore, may compare a given performance of a portion of code (e.g., from a time period in the past) to what a given performance impact would be on a same comparable time period (e.g., another five minutes after the code would be released) to determine and illustrate any affect (e.g., potential value lost, transactions lost, visits missed, revenue difference, etc.) due to the performance change or predicted anomaly or error. (For example, the IDE could determine and display a message to the code developer, effectively along the lines of: "This particular change could result in an extra 250 ms latency, which over the course of a day, could result in $1 M in revenue loss per day when compared to previous versions of the code." This surely would quantify the importance and magnitude of the potential impact his/her code has.)

Figure 15:
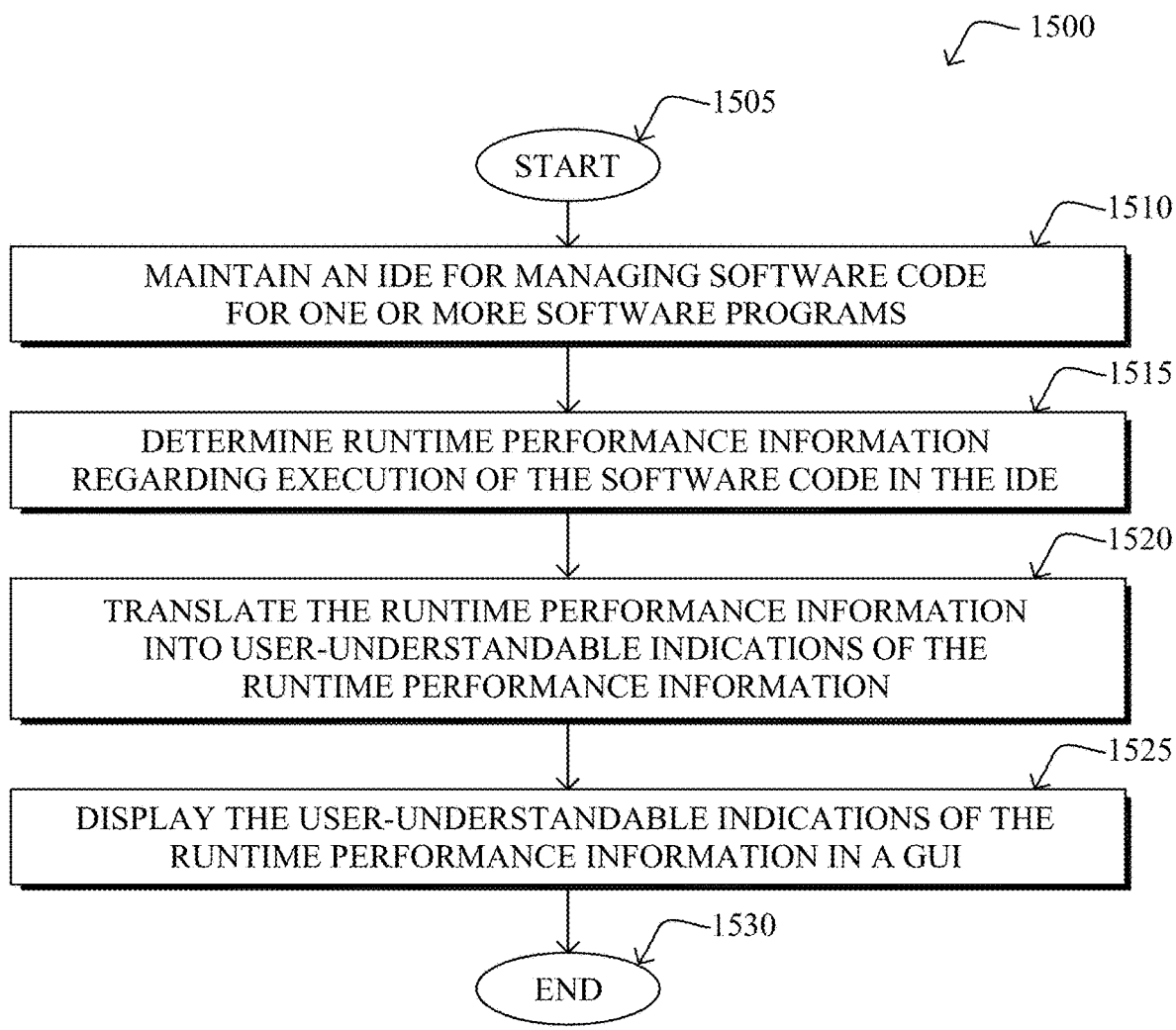
FIG. 15 illustrates an example procedure for runtime intelligence within an IDE.

In closing, FIG. 15 illustrates an example procedure for runtime intelligence within an IDE in accordance with one or more embodiments described herein. For example, one or more non-generic, specifically configured devices (e.g., a controller, an application agent, a network agent, a server, software application etc.) may perform procedure 1500 by executing stored instructions. The procedure may start at step 1505, and continues to step 1510, where, as described in greater detail above, a computing device maintains an integrated development environment (IDE) for managing software code for one or more software programs. In some embodiments, the IDE may be employed on a user device, such as a laptop or personal computer, or may be displayed on such a device when the IDE is serviced in the Cloud.

In step 1515, as described in greater detail above, the computing device determines, at the IDE, runtime performance information regarding execution of the software code in the IDE across various environments. The runtime performance information may correspond to individual portions of the software code, which may comprise class-level codes and/or method-level codes, and may also be custom defined based on receiving user-generated instructions (e.g., "info points" as mentioned above). In some embodiments, the runtime performance information may be based on external information (such as from one or more external sources) or may be internally computed. Examples of runtime performance information include snapshots, stack traces, call graphs, performance statistics, monitoring data, and business performance data.

In step 1520, as described in greater detail above, the IDE (e.g., IDE or IDE plugin) translates the runtime performance information into user-understandable indications of the runtime performance information (e.g., color-coded code, highlighted code, warning indicators, inline tags, etc.). For example, as detailed above, the IDE may first determine baselines of runtime performance information (e.g., based on external sources of baseline information and/or based on past performance of the individual portions of the software code within the IDE), and then the user-understandable indications may be based on a comparison to the baselines (e.g., indicating divergence above a threshold, a large change, a longer delay, and so on).

Accordingly, the IDE may then display the user-understandable indications of the runtime performance information in a graphical user interface (GUI) in step 1525 when corresponding individual portions of the software code are also displayed. For example, relevant individual portions of the code may be specifically highlighted in the GUI, such as those determined to have lagging performance (e.g., in comparison to determined baselines of runtime performance information). That is, the techniques herein may display a summary of top classes and methods which are performing poorly, so that a user can navigate to a particular class/method and drill down to next level of detail. Other information may also be displayed. For instance, if runtime performance information related to different software code versions is determined, then the information for each of the versions may be simultaneously displayed in the GUI. In addition, a determined business transaction impact corresponding to the individual portions of the software code may also be displayed (e.g., when a respective corresponding individual portion of the software code is displayed in the GUI), as described above. Furthermore, a user may make certain selections within the GUI (where the IDE receives the user selection), such as selecting a particular individual portion of the software code that is displayed in the GUI, and then the IDE, in response, may display runtime performance information for the particular individual portion that is more detailed (e.g., "drilled down") than the user-understandable indications of the runtime performance information (e.g., the actual delay, the actual errors, text details of warnings, the linked code that is causing the problem, etc.). As another example, when runtime performance information comprises stack traces that are displayed in the GUI, user selection on a particular stack trace may correspondingly result in opening the stack trace within the IDE.

The simplified example procedure 1500 may then end in step 1530, notably with the option of continuing (repeating) to maintain the IDE, receive updates to code, determine further runtime performance information, and so on, in order to provide for further runtime intelligence within an IDE, as detailed above. Note also that the procedure 1500 may comprise further steps not specifically shown, such as providing a root cause debugger tool within the IDE, presenting a summary of poorly performing methods, classes, and other user-understandable indications (e.g., so that users—developers, engineers, and their managers—can deep dive into the next level of performance details and errors like stacktraces, etc.), among others.

Figure 16:
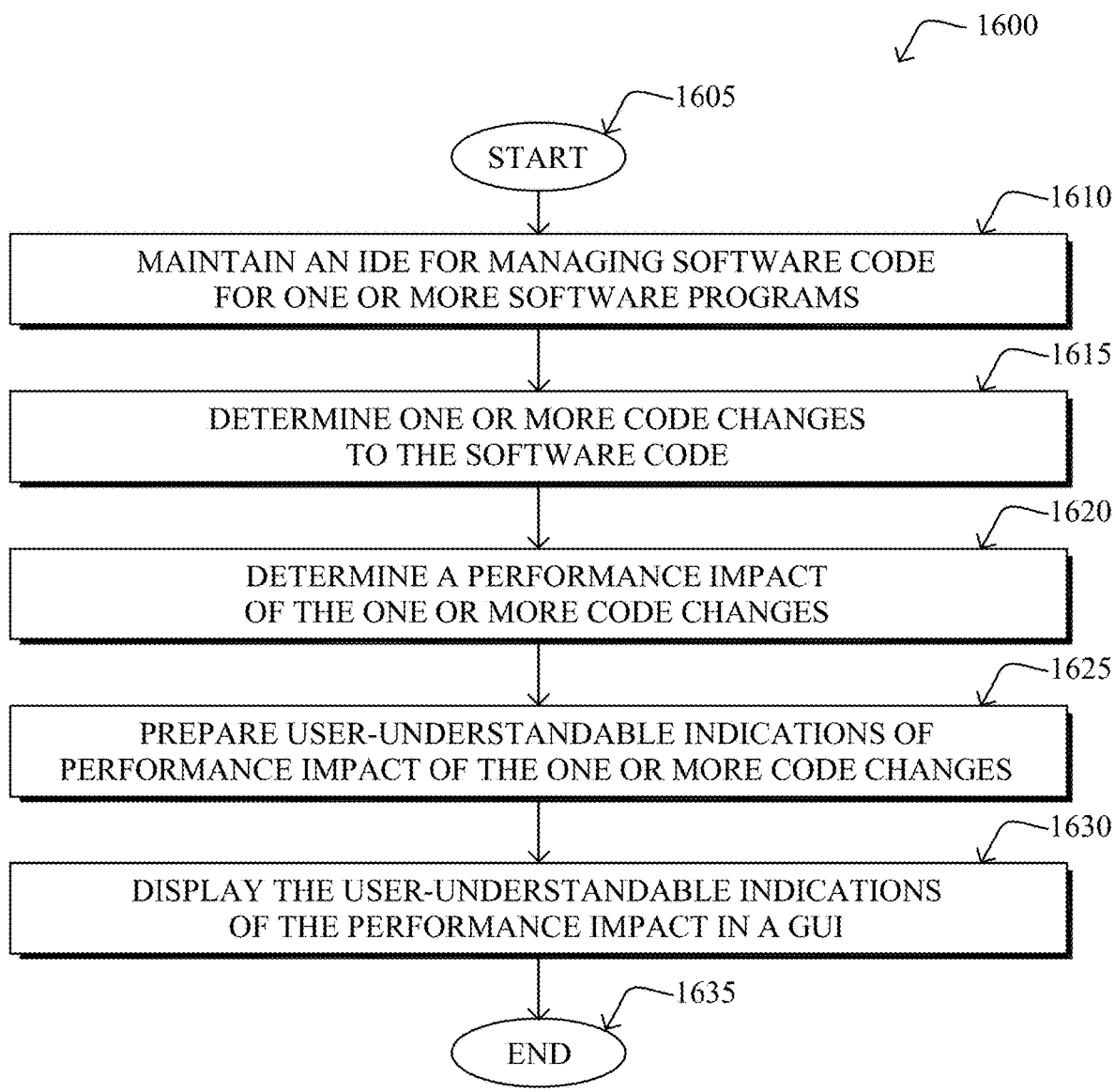
FIG. 16 illustrates an example procedure for predicting code change impact within an IDE.

Additionally, FIG. 16 illustrates an example procedure for predicting code change impact within an IDE in accordance with one or more embodiments described herein. For example, one or more non-generic, specifically configured devices (e.g., a controller, an application agent, a network agent, a server, etc.) may perform procedure 1600 by executing stored instructions. The procedure may start at step 1605, and continues to step 1610, where, again, a computing device maintains an IDE for managing software code for one or more software programs. In step 1615, as described in greater detail above, the IDE may also determine one or more code changes to the software code. In some embodiments, the IDE may determine a change between a particular given version of the software code and a subsequent version, such as from a software update or revision. Examples of code changes include an added code, a removed code, added anti-patterns, added service dependencies, and so on.

In step 1620, as described in greater detail above, the IDE determines a performance impact (such as increased latency) of each of the one or more code changes (e.g., through various algorithms by leveraging existing performance data or calculating the new number of microprocessor instructions, etc.). For instance, in some embodiments, the determination in step 1620 comprises executing the code change (e.g., separately or as a whole with the entire code), determining runtime performance information resulting from the code change, and then calculating a difference between the determined runtime performance and the runtime performance from the version prior to the code change. In other embodiments, the performance impact may be determined by estimation of a change based on baselines of runtime performance information. In other embodiments, especially in case of new code introductions, an estimate can be prepared by calculating the amount of new microprocessor instructions, for the particular CPU specifications given by the user. Said differently, the performance impact may be determined through various algorithms, such as 1) for existing code and changes, the techniques herein can use existing performance metrics to estimate the impact, while 2) for totally new code, the techniques herein can estimate the new microprocessor instructions and calculate the potential latency and impact, accordingly.

In step 1625, as described in greater detail above, the IDE prepares user-understandable indications of the performance impact of the one or more code changes (e.g., a percentage change, a value change, a warning indication, color-coding of the code changes, and so on). In some embodiments, the user-understandable indications may be based on a comparison to a baseline (e.g., where the code is re-used from previous programs), while in others, the comparison may be to previous iterations of the code within the IDE (e.g., determining the difference(s) from the last time the code was executed in the runtime environment of the IDE).

Accordingly, in step 1630, the IDE may then display the user-understandable indications of the performance impact in the GUI when a respective code change is displayed in the GUI. In some embodiments, additional information may also be displayed, as mentioned above.

The simplified example procedure 1600 may then end in step 1635, notably with the option of continuing (repeating) to catch code changes and illustrate their impact to users, in order to provide for further predicting of code change impacts within an IDE.

It should be noted that certain steps within procedures 1500-1600 may be optional as described above, and the steps shown in FIGS. 15-16 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 1500 and 1600 are described separately, certain steps from each procedure may be incorporated into each other procedure, and the procedures are not meant to be mutually exclusive.

The techniques described herein, therefore, provide for runtime intelligence within an IDE. In particular, while developers today can obtain some limited information through IDE profilers, the techniques herein further provide real-world data from staging and production environments that has not otherwise been available, helping developers find and fix issues in a proactive manner (e.g., even before they make it to production). In addition, the techniques herein gather relevant data, and present it in a format (at the level of classes and methods) that is directly consumable or accessible by developers in a routine fashion, such as in a format that they are accustomed to and really care for (e.g., directly within the IDE where they spend a vast majority of their time), unlike application performance management (APM) tools currently available.

While there have been shown and described illustrative embodiments that provide for runtime intelligence within an IDE, it is to be understood that various other adaptations and modifications may be made within the spirit and scope of the embodiments herein. For example, while certain embodiments are described herein with respect to certain types of networks in particular, the techniques are not limited as such and may be used with any computer network, generally, in other embodiments. Moreover, while specific technologies, protocols, and associated devices have been shown, such as Java, TCP, IP, and so on, other suitable technologies, protocols, and associated devices may be used in accordance with the techniques described above. In addition, while certain devices are shown, and with certain functionality being performed on certain devices, other suitable devices and process locations may be used, accordingly. That is, the embodiments have been shown and described herein with relation to specific network configurations (orientations, topologies, protocols, terminology, processing locations, etc.). However, the embodiments in their broader sense are not as limited, and may, in fact, be used with other types of networks, protocols, and configurations.

Moreover, while the present disclosure contains many other specifics, these should not be construed as limitations on the scope of any invention or of what may be claimed, but rather as descriptions of features that may be specific to particular embodiments of particular inventions. Certain features that are described in this document in the context of separate embodiments can also be implemented in combination in a single embodiment. Conversely, various features that are described in the context of a single embodiment can also be implemented in multiple embodiments separately or in any suitable sub-combination. Further, although features may be described above as acting in certain combinations and even initially claimed as such, one or more features from a claimed combination can in some cases be excised from the combination, and the claimed combination may be directed to a sub-combination or variation of a sub-combination.

For instance, while certain aspects of the present disclosure are described in terms of being performed "within an IDE", those skilled in the art will appreciate that an integrated development environment may comprise other types of code review tools or any other place that a developer engages in to write and/or review software code. For example, as mentioned above, the "IDE" herein may comprise the IDE on a user's device, or an agent or plugin that is integrated with the IDE. That is, in certain embodiments, the IDE plugin (e.g., 850) translates/prepares runtime performance information into user-understandable indications, and works with an IDE's current APIs to display them in a GUI. Said differently, an IDE plugin may interact with IDE APIs to understand classes and methods in the current display to retrieve relevant performance metrics from the backend code mapper. Accordingly, where the term "IDE" is used in the description and/or claims herein, the IDE, agents of the IDE, or an IDE plugin may perform certain aspects of the techniques herein where appropriate and where accessible and so configured to do so.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in the present disclosure should not be understood as requiring such separation in all embodiments.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   maintaining, on a computing device, an integrated development environment (IDE) for managing software code for one or more software programs that perform at least one monitored business transaction;
   determining, at the IDE on the computing device, one or more code changes to the software code between a given version of the software code and a subsequent version of the software code;
   determining, by the IDE, a performance impact of each of the one or more code changes to the at least one monitored business transaction, wherein the performance impact is indicative of an effect of the one or more code changes on business activity associated with the at least one monitored business transaction measured as a potential value lost, a number of transactions lost, a number of visits missed, or a revenue difference;
   preparing, by the IDE, user-understandable indications of the performance impact of the one or more code changes; and
   displaying, by the IDE, the user-understandable indications of the performance impact in a graphical user interface (GUI) when a respective code change is displayed in the GUI.

2. The method as in claim 1, further comprising:
   determining runtime performance information regarding execution of the software code in the IDE, the runtime performance information corresponding to individual portions of the software code;
   determining baselines of runtime performance information;
   determining lagging performance of individual portions of the software code in comparison to the baselines; and
   highlighting, within the GUI, individual portions of the software code having lagging performance.

3. The method as in claim 1, further comprising:
   determining baselines of runtime performance information based on external sources of baseline information, wherein the user-understandable indications are based on a comparison to the baselines.

4. The method as in claim 1, further comprising:
   determining baselines of runtime performance information based on past performance of the individual portions of the software code within the IDE, wherein the user-understandable indications are based on a comparison to the baselines.

5. The method as in claim 1, further comprising:
   determining runtime performance information regarding execution of different versions of the software code in the IDE; and
   displaying the runtime performance information for the different versions simultaneously in the GUI.

6. The method as in claim 1, wherein the performance impact comprises business transaction impact corresponding to individual portions of the software, and wherein the method further comprises:
   displaying the business transaction impact in the GUI when a respective corresponding individual portion of the software code is displayed in the GUI.

7. The method as in claim 1, wherein the one or more code changes to the software code are selected from a group consisting of: added code; removed code; added anti-patterns; and added service dependencies.

8. The method as in claim 1, wherein determining the performance impact of each of the one or more code changes comprises:
   executing the one or more code changes;
   determining runtime performance information regarding execution of the one or more code changes; and
   calculating a difference between runtime performance information of the given version of the software code and the determined runtime performance information of the subsequent version of the software code.

9. The method as in claim 1, wherein determining the performance impact of each of the one or more code changes comprises:
   estimating the change in performance based on baselines of runtime performance information.

10. The method as in claim 1, wherein the performance impact comprises increased latency.

11. The method as in claim 1, wherein the user-understandable indications of the performance impact comprises a percentage change.

12. A tangible, non-transitory, computer-readable medium storing program instructions that cause a computer to execute a process comprising:
   maintaining an integrated development environment (IDE) for managing software code for one or more software programs that perform at least one monitored business transaction;
   determining one or more code changes to the software code between a given version of the software code and a subsequent version of the software code;

determining a performance impact of each of the one or more code changes to the at least one monitored business transaction, wherein the performance impact is indicative of an effect of the one or more code changes on business activity associated with the at least one monitored business transaction measured as a potential value lost, a number of transactions lost, a number of visits missed, or a revenue difference;

preparing user-understandable indications of the performance impact of the one or more code changes; and displaying the user-understandable indications of the performance impact in a graphical user interface (GUI) of the IDE when a respective code change is displayed in the GUI.

13. The computer-readable medium as in claim 12, wherein the process further comprises:

determining runtime performance information regarding execution of the software code in the IDE, the runtime performance information corresponding to individual portions of the software code;

determining baselines of runtime performance information;

determining lagging performance of individual portions of the software code in comparison to the baselines; and highlighting, within the GUI, individual portions of the software code having lagging performance.

14. The computer-readable medium as in claim 12, wherein the process further comprises:

determining baselines of runtime performance information based on external sources of baseline information, wherein the user-understandable indications are based on a comparison to the baselines.

15. The computer-readable medium as in claim 12, wherein the performance impact comprises business transaction impact corresponding to individual portions of the software, and wherein the process further comprises:

displaying the business transaction impact in the GUI when a respective corresponding individual portion of the software code is displayed in the GUI.

16. The computer-readable medium as in claim 12, wherein determining the performance impact of each of the one or more code changes comprises at least one of:

i) estimating the change in performance based on baselines of runtime performance information; and ii) executing the one or more code changes, determining runtime performance information regarding execution of the one or more code changes, and calculating a difference between runtime performance information of the given version of the software code and the determined runtime performance information of the subsequent version of the software code.

17. An apparatus, comprising:

one or more network interfaces configured to communicate in a computer network;

a processor coupled to the network interfaces and adapted to execute one or more processes; and a memory configured to store a process executable by the processor, the process when executed operable to:

maintain an integrated development environment (IDE) for managing software code for one or more software programs that perform at least one monitored business transaction;

determine one or more code changes to the software code between a given version of the software code and a subsequent version of the software code;

determine a performance impact of each of the one or more code changes to the at least one monitored business transaction, wherein the performance impact is indicative of an effect of the one or more code changes on business activity associated with the at least one monitored business transaction measured as a potential value lost, a number of transactions lost, a number of visits missed, or a revenue difference;

prepare user-understandable indications of the performance impact of the one or more code changes; and display the user-understandable indications of the performance impact in a graphical user interface (GUI) of the IDE when a respective code change is displayed in the GUI.

18. The apparatus as in claim 17, wherein the process when executed is further operable to:

determine runtime performance information regarding execution of the software code in the IDE, the runtime performance information corresponding to individual portions of the software code;

determine baselines of runtime performance information;

determine lagging performance of individual portions of the software code in comparison to the baselines; and highlight, within the GUI, individual portions of the software code having lagging performance.

19. The apparatus as in claim 17, wherein the process when executed is further operable to:

determine baselines of runtime performance information based on external sources of baseline information, wherein the user-understandable indications are based on a comparison to the baselines.

20. The apparatus as in claim 17, wherein the process when executed is further operable to:

determine baselines of runtime performance information based on past performance of the individual portions of the software code within the IDE, wherein the user-understandable indications are based on a comparison to the baselines.

* * * * *

UNITED STATES PATENT AND TRADEMARK OFFICE
CERTIFICATE OF CORRECTION

PATENT NO. : 10,635,566 B1
APPLICATION NO. : 15/665418
DATED : April 28, 2020
INVENTOR(S) : Satish Talluri et al.

It is certified that error appears in the above-identified patent and that said Letters Patent is hereby corrected as shown below:

In the Specification

In Column 17, Line 47, please amend as shown:
developers spend most of their time (~90% or more) in their Signed and Sealed this
Twenty-second Day of September, 2020

Andrei Iancu
*Director of the United States Patent and Trademark Office*